US008515230B2

(12) United States Patent
Lapp

(10) Patent No.: US 8,515,230 B2
(45) Date of Patent: Aug. 20, 2013

(54) CABLE WITH EMBEDDED INFORMATION CARRIER UNIT

(75) Inventor: Siegbert Lapp, Stuttgart (DE)

(73) Assignee: Lapp Engineering & Co., Cham (CH)

( * ) Notice: Subject to any disclaimer, the term of this patent is extended or adjusted under 35 U.S.C. 154(b) by 707 days.

(21) Appl. No.: 12/587,403

(22) Filed: Oct. 5, 2009

(65) Prior Publication Data

US 2010/0158454 A1 Jun. 24, 2010

Related U.S. Application Data

(63) Continuation of application No. PCT/EP2008/002686, filed on Apr. 4, 2008.

(30) Foreign Application Priority Data

Apr. 10, 2007 (DE) ......................... 10 2007 017 965

(51) Int. Cl.
*G02B 6/44* (2006.01)
*G02B 6/00* (2006.01)

(52) U.S. Cl.
USPC .......................................... 385/101; 385/147

(58) Field of Classification Search
USPC ....... 385/100, 101, 115, 134, 147; 174/70 R; 439/577
See application file for complete search history.

(56) References Cited

U.S. PATENT DOCUMENTS

| | | | |
|---|---|---|---|
| 4,751,614 | A | 6/1988 | Mehnert |
| 4,880,484 | A | 11/1989 | Obermeier et al. |
| 5,045,368 | A | 9/1991 | Cosman et al. |
| 5,106,175 | A | 4/1992 | Davis et al. |
| 5,305,410 | A | 4/1994 | Arroyo |
| 5,532,598 | A | 7/1996 | Clark, Jr. et al. |
| 5,541,803 | A | 7/1996 | Pope, Jr. et al. |
| 5,577,147 | A | 11/1996 | Arroyo et al. |
| 5,578,926 | A | 11/1996 | Reinhardt |
| 5,729,966 | A | 3/1998 | Grulick |
| 5,808,779 | A | 9/1998 | Weis |
| 5,892,430 | A | 4/1999 | Wiesman et al. |
| 5,902,251 | A | 5/1999 | vanHooydonk |
| 5,986,207 | A | 11/1999 | Uhlenhuth |
| 6,172,608 | B1 | 1/2001 | Cole |
| 6,246,328 | B1 | 6/2001 | Parkinson et al. |
| 6,388,575 | B1 | 5/2002 | Galloway |

(Continued)

FOREIGN PATENT DOCUMENTS

| | | |
|---|---|---|
| CA | 2 581 186 | 5/2006 |
| DE | 17 65 765 | 8/1971 |

(Continued)

*Primary Examiner* — Akm Enayet Ullah
(74) *Attorney, Agent, or Firm* — Lipsitz & McAllister, LLC

(57) ABSTRACT

In order to improve a cable, comprising an inner cable body, in which at least one conductor strand of an optical and/or electrical conductor runs in the longitudinal direction of the cable, a cable sheath, enclosing the inner cable body and lying between an outer surface of the cable and the inner cable body, and at least one information carrier unit, disposed within the outer surface of the cable, in such a way that said information carrier unit can be easily applied during the production of the cable and is positioned in a protected and reliable manner in the cable, it is proposed that the information carrier unit can be read by electromagnetic field coupling and that the information carrier unit is disposed on an intermediate sheath lying between the inner cable body and an outer cable sheath.

20 Claims, 14 Drawing Sheets

(56) References Cited

U.S. PATENT DOCUMENTS

| | | | | |
|---|---|---|---|---|
| 6,563,094 | B2 | 5/2003 | Kochman et al. | |
| 6,791,454 | B2 | 9/2004 | Mangold et al. | |
| 6,897,822 | B2 | 5/2005 | Sparks et al. | |
| 6,915,050 | B2 * | 7/2005 | Koyasu et al. | 385/105 |
| 6,973,243 | B2 * | 12/2005 | Koyasu et al. | 385/100 |
| 7,041,906 | B2 | 5/2006 | John | |
| 7,046,146 | B2 | 5/2006 | Wuidart et al. | |
| 7,158,012 | B2 | 1/2007 | Wiesman et al. | |
| 7,170,405 | B2 | 1/2007 | Daum et al. | |
| 7,201,221 | B2 | 4/2007 | Tubel et al. | |
| 7,223,962 | B2 | 5/2007 | Fageraas et al. | |
| 7,265,533 | B2 | 9/2007 | Lightbody et al. | |
| 7,313,304 | B2 | 12/2007 | Andrews et al. | |
| 7,526,163 | B2 * | 4/2009 | Freeland et al. | 385/101 |
| 7,526,582 | B2 | 4/2009 | Best et al. | |
| 7,539,379 | B2 | 5/2009 | Khoshaba et al. | |
| 7,552,872 | B2 | 6/2009 | Tokita et al. | |
| 7,618,291 | B2 | 11/2009 | Standke | |
| 7,856,185 | B2 | 12/2010 | Hudgins et al. | |
| 7,940,182 | B2 * | 5/2011 | Lange et al. | 340/572.1 |
| 8,023,786 | B2 * | 9/2011 | Lapp | 385/101 |
| 2002/0034365 | A1 | 3/2002 | Vogelsang | |
| 2002/0061727 | A1 | 5/2002 | Mangold et al. | |
| 2004/0149488 | A1 | 8/2004 | John | |
| 2004/0156601 | A1 | 8/2004 | Koyasu et al. | |
| 2004/0184747 | A1 * | 9/2004 | Koyasu et al. | 385/101 |
| 2005/0083203 | A1 | 4/2005 | Surkau | |
| 2005/0129088 | A1 | 6/2005 | Rajendran et al. | |
| 2005/0140512 | A1 | 6/2005 | Sakama et al. | |
| 2006/0012482 | A1 | 1/2006 | Zalud et al. | |
| 2006/0214801 | A1 | 9/2006 | Murofushi et al. | |
| 2007/0146230 | A1 | 6/2007 | Overhultz et al. | |
| 2008/0204235 | A1 | 8/2008 | Cook | |
| 2008/0218355 | A1 * | 9/2008 | Downie et al. | 340/572.7 |
| 2008/0318477 | A1 | 12/2008 | Standke | |
| 2009/0001930 | A1 | 1/2009 | Pohjonen | |
| 2009/0146898 | A1 | 6/2009 | Akiho et al. | |
| 2009/0156042 | A1 | 6/2009 | Radenne et al. | |
| 2010/0109670 | A1 | 5/2010 | Arnaud et al. | |
| 2010/0142902 | A1 * | 6/2010 | Lapp | 385/101 |
| 2010/0147583 | A1 * | 6/2010 | Lapp | 174/70 R |
| 2010/0165557 | A1 * | 7/2010 | Lapp | 361/679.01 |
| 2010/0166374 | A1 * | 7/2010 | Lapp | 385/101 |
| 2010/0172618 | A1 * | 7/2010 | Lapp | 385/101 |

FOREIGN PATENT DOCUMENTS

| | | |
|---|---|---|
| DE | 36 20 595 | 2/1987 |
| DE | 37 43 470 | 3/1989 |
| DE | 43 33 121 | 5/1994 |
| DE | 690 09 113 | 11/1994 |
| DE | 690 14 521 | 6/1995 |
| DE | 690 16 035 | 6/1995 |
| DE | 196 01 651 | 7/1997 |
| DE | 196 39 902 | 12/1997 |
| DE | 197 02 536 | 7/1998 |
| DE | 198 14 540 | 10/1999 |
| DE | 299 21 017 | 5/2000 |
| DE | 695 16 138 | 12/2000 |
| DE | 199 55 120 | 5/2001 |
| DE | 101 11 371 | 9/2002 |
| DE | 101 44 552 | 2/2004 |
| DE | 20 2004 0170158 | 2/2005 |
| DE | 10 2004 051 594 | 5/2006 |
| DE | 10 2005 006 318 | 8/2006 |
| DE | 20 2005 006 373 | 8/2006 |
| DE | 10 2005 044 918 | 2/2007 |
| DE | 10 2005 044 482 | 4/2007 |
| DE | 10 2005 058 385 | 6/2007 |
| DE | 10 2006 036 721 | 2/2008 |
| DE | 10 2006 036 719 | 4/2008 |
| EP | 0 408 320 | 1/1991 |
| EP | 0 419 637 | 4/1991 |
| EP | 1 191 354 | 3/2002 |
| EP | 1 220 236 | 7/2002 |
| EP | 1 424 882 | 6/2004 |
| EP | 1 548 639 | 6/2005 |
| EP | 1 772 657 | 4/2007 |
| EP | 1 884 811 | 2/2008 |
| FR | 2 830 941 | 4/2003 |
| JP | 2003203527 | 7/2003 |
| JP | 2005184424 | 7/2005 |
| WO | 90/10879 | 9/1990 |
| WO | 91/04503 | 4/1991 |
| WO | 95/32439 | 11/1995 |
| WO | 03/067512 | 8/2003 |
| WO | 03/091665 | 11/2003 |
| WO | 2004/072988 | 8/2004 |
| WO | 2006/063023 | 6/2006 |
| WO | WO 2006/063023 | 6/2006 |
| WO | 2007/016956 | 2/2007 |
| WO | WO 2007/016956 | 2/2007 |
| WO | 2007/036346 | 4/2007 |
| WO | WO 2007/036346 | 4/2007 |

* cited by examiner

CABLE WITH EMBEDDED INFORMATION CARRIER UNIT

This application is a continuation of International application No. PCT/EP2008/002686 filed on Apr. 4, 2008.

This patent application claims the benefit of International application No. PCT/EP2008/002686 of Apr. 4, 2008 and German application No. 10 2007 017 965.2 of Apr. 10, 2007, the teachings and disclosure of which are hereby incorporated in their entirety by reference thereto.

The invention relates to a cable, comprising an inner cable body, in which at least one conductor strand of an optical and/or electrical conductor runs in the longitudinal direction of the cable, a cable sheath, enclosing the inner cable body and lying between an outer surface of the cable and the inner cable body, and at least one information carrier unit, disposed within the outer surface of the cable.

Cables of this kind are known from the prior art.

With these cables, there is the problem of disposing the information carrier unit at a suitable point, specifically such that it can be easily attached during the production of the cable and is positioned in a protected and reliable manner in the cable, in order not to adversely influence the service life of an information carrier unit of this kind.

This object is achieved according to the invention in the case of a cable of the type described at the beginning by it being possible for the information carrier unit to be read by electromagnetic field coupling and by the information carrier unit being disposed on an intermediate sheath lying between the inner cable body and an outer cable sheath.

The advantage of disposing the information carrier unit in a so-called intermediate sheath of the cable sheath can be seen in that there is thereby provided a simple possible way of attaching an information carrier unit, which also optimally protects the information carrier unit.

In principle it is possible to place the information carrier unit on the intermediate sheath and to embed it at least partially into the outer sheath.

Another advantageous solution provides that the information carrier unit is at least partly embedded in the intermediate sheath, in order to make it possible to securely fix the information carrier unit to the intermediate sheath, so that after the production of the intermediate sheath and the embedding of the information carrier unit, the outer cable sheath surrounds both the intermediate sheath and the information carrier unit in a protective manner.

In this case, it is advantageous if the integrated circuit of the information carrier unit is at least partly embedded in the intermediate sheath, since with many types of information carrier units, the integrated circuit has the greatest thickness, so that it is advantageous for it to be embedded in the intermediate sheath.

Furthermore, it is advantageous if the integrated circuit is predominantly embedded in the intermediate sheath, to avoid the integrated circuit protruding appreciably beyond the outer surface of the intermediate sheath.

It is particularly advantageous if the integrated circuit is substantially completely embedded in the intermediate sheath, so that the intermediate sheath can consequently receive and protect the integrated circuit.

With regard to the way in which the antenna unit is disposed on the intermediate sheath, no further details have been specified so far. It is suitable if the antenna unit of the information carrier unit is disposed at a surface of the intermediate sheath, in order to be able easily to connect the antenna unit to the integrated circuit.

The simplest solution provides in this respect that the antenna unit is disposed on the surface of the intermediate sheath. Disposing the antenna unit on the surface in this way can be realized either by the antenna unit being placed on the surface of the intermediate sheath in the form of a wire or by the antenna unit taking the form of a conductor track that is formed on the surface of the intermediate sheath.

It is still more advantageous, however, if the antenna unit is at least partly embedded in the intermediate sheath.

Such partial embedding of the antenna unit in the intermediate sheath may likewise take place by embedding a wire. For example, if the antenna unit is a simple loop.

However, it is also conceivable to realize embedding of a conductor track formed by a conductive paste or a conductive lacquer.

The protection of the antenna unit is still better if the antenna unit is predominantly embedded in the intermediate sheath.

The protection is particularly good if the antenna unit is substantially embedded in the intermediate sheath.

As already mentioned, there are various advantageous embodiments of the antenna unit. One advantageous embodiment provides that the antenna unit is formed by an antenna wire.

Such an antenna wire may, for example, be laid as such onto the surface of the intermediate sheath and connected to the integrated circuit.

However, there is also the possibility of embedding the antenna wire partially or largely or completely in the intermediate sheath.

Another suitable embodiment of the antenna unit provides that it is formed as a conductor track on a base.

Such a formation of the antenna unit as a conductor track on a base has the advantage that the conductor track can be produced in advance on the base and then can be disposed together with the base on the intermediate sheath. In this case, the integrated circuit may likewise be disposed on the base.

There is also the possibility of disposing the integrated circuit on the intermediate sheath in advance and subsequently disposing the antenna unit with the base on the intermediate sheath.

A further advantageous possibility also envisages first disposing the antenna unit with the base on the intermediate sheath and then placing the integrated circuit on it.

With regard to how the base is disposed in relation to the surface of the intermediate sheath, an advantageous solution provides that the base lies at the surface of the intermediate sheath.

This can be realized by the base being on the surface of the intermediate sheath.

It is alternatively conceivable for the base to be at least partly embedded in the intermediate sheath. It is still better if the base is predominantly embedded in the intermediate sheath and a particularly suitable solution for the protection of the base provides that the base is substantially embedded in the intermediate sheath.

Another advantageous embodiment of the antenna unit provides that the antenna unit is formed as a conductor track disposed directly on the intermediate sheath. Forming the conductor track in such a way makes it possible for the intermediate sheath itself to be used directly as a base.

In this case, the conductor track may, for example, be formed by a conductive material applied to the intermediate sheath.

The conductive material may in this case be disposed directly on the surface of the intermediate sheath, and consequently merely be located on the surface of the same and be covered by the outer sheath.

Better fixing of the conductor track envisages that the conductor track is at least partially embedded in the intermediate sheath.

It is still better in this respect for the conductor track to be largely or substantially completely embedded in the intermediate sheath, since this makes it possible, in particular when an electrically conductive material is applied, to achieve better protection of the same and also better protection of the contacting between the conductive material and the integrated circuit.

A particularly advantageous embodiment provides that the conductor track is applied to the intermediate sheath by a printing operation or impressing operation.

In the case of one embodiment of the information carrier unit, when the integrated circuit is placed onto the conductor tracks which form the antenna unit and are, for example, disposed on the intermediate sheath, contacting between connecting points of the integrated circuit and the conductor tracks takes place at the same time, for example by an electrically conductive adhesive. For this reason, the integrated circuit protrudes above the conductor tracks.

In the case of such an exemplary embodiment, it may therefore be of advantage if the integrated circuit stands above the surface of the intermediate sheath and is at least partly embedded in the outer sheath.

In the case of one embodiment, it is conceivable for the integrated circuit to be substantially embedded in the outer sheath.

With regard to the formation of the intermediate sheath, no further details have been specified.

In one embodiment, it is provided that the intermediate sheath has a thickness which corresponds at least to a height of the information carrier unit, so that the information carrier unit can be at least partially embedded in the intermediate sheath.

In the case of another embodiment, it is provided that the intermediate sheath has, between the information carrier unit and the inner cable body, a material layer compensating for surface undulations of the inner cable body.

There is consequently the possibility of integrating information carrier units, in particular those that are locally pressure-sensitive, into the cable, since the material layer substantially prevents compressive forces which are locally unequal due to the surface undulations from acting on the information carrier unit, in particular during bending of the cable.

Furthermore, it is provided in the case of an advantageous embodiment that the intermediate sheath forms a surface which is substantially free from surface undulations of the inner cable body, so that a supporting surface that avoids mechanical loading is available for the information carrier unit.

It is of advantage in this respect if the intermediate sheath has a substantially smooth, ideally even, substantially cylindrical, surface for the information carrier unit.

With regard to the forming of the intermediate cable sheath and the outer cable sheath, no further details have been specified in connection with the exemplary embodiments described so far. In principle, the outer cable sheath may be an opaque outer cable sheath, in particular comprising fillers.

However, in order to be able, for example, to detect the information carrier unit, an advantageous solution provides that the outer cable sheath comprises a material that is transparent in the visible spectral range, so that the outer cable sheath makes it possible, because of its transparency, to establish the location of the disposition of the information carrier unit in the longitudinal direction of the cable by optical examination of the cable.

This has the great advantage that reading out the information from one of the information carrier units of the cable is made easier, since the location of the information carrier unit can be easily established through the transparent cable sheath.

A further possible way of detecting the location of the information carrier unit that is easy and reliable for a user provides that the outer cable sheath carries an inscription and that the inscription is disposed in a defined relationship with respect to the location of the information carrier unit, so that the inscription makes it possible to find the location of the information carrier unit in an easy way.

In this respect there is a very wide range of possible ways of generating such a relationship with the inscription. For example, it is conceivable to dispose the information carrier unit either at the beginning or at the end of the inscription.

However, it is also conceivable to leave a gap in the inscription, which indicates where the information carrier unit is disposed in relation to the inscription.

As an alternative to this, however, it is also conceivable to provide special inscription symbols in the region of the inscription, which then comprise details of the location of the sensor.

With regard to the structure of the information carrier units, no further details have been specified so far.

An advantageous solution provides that the information carrier unit has at least one memory for the information that can be read out.

Such a memory could be formed in a very wide variety of ways. For example, the memory could be formed such that the information stored in it can be overwritten by the read device.

However, a particularly advantageous solution provides that the memory has a memory area in which items of information once written are stored such that they are write-protected.

Such a memory area is suitable, for example, for storing an identification code for the information carrier unit or other data specific to this information carrier unit, which can no longer be changed by any of the users.

Such a memory area is also suitable, however, for the cable manufacturer to store information which is not to be overwritten. Such information is, for example, cable data, cable specifications or else details of the type of cable and how it can be used.

However, these data may, for example, also be supplemented by data comprising details about the manufacture of the specific cable or data representing test records from final testing of the cable.

In addition, a memory according to the invention may also be formed furthermore in such a way that it has a memory area in which items of information are stored such that they are write-protected by an access code.

Such write-protected storage of information may, for example, comprise data which can be stored by a user. For example, after preparation of the cable, a user could store in the memory area data concerning the preparation of the cable or concerning the overall length of the cable or concerning the respective portions over the length of the cable, the user being provided with an access code by the cable manufacturer for this purpose, in order to store these data in the memory area.

A further advantageous embodiment provides that the memory has a memory area to which information can be freely written.

Such a memory area may, for example, receive information which is to be stored by the cable user in the cable, for example concerning the type of installation or the preparation of the same.

In particular when a number of information carrier units are used, it would be conceivable, for example, for it to be possible for all the information carrier units to be addressed with one access code. However, this has the disadvantage that the information carrier units consequently cannot be selectively used, for example to assign different information to specific portions of the cable.

One conceivable solution for assigning different information to different portions of the cable would be that each of the information carrier units bears a different specified length, so that, by reading out the specified length of an information carrier unit, its distance from one of the ends of the cable or from both ends of the cable can be determined.

For this reason, it is advantageous if each of the information carrier units can be individually addressed by an access code.

In connection with the description so far of the information carrier units, it has just been assumed that they carry information which has been stored in the information carrier units by external read/write devices either before or during the production of the cable or during the use of the cable.

A further advantageous solution for a cable according to the invention provides that the at least one information carrier unit of the cable picks up at least one measured value of an associated sensor, that is to say that the information carrier unit not only stores and makes available external information but is itself capable of acquiring information about the cable, that is to say physical state variables of the cable.

The advantage of this solution can be seen in that it enables the information carrier unit not only to be used for making information available for reading out but also to be used for providing, by means of the sensor, indications about the state of the cable, for example about physical state variables of the cable.

In particular, such sensing of state variables may take place during the operation of the cable or else independently of the operation of the cable.

Consequently, there is an optimum possibility of on the one hand sensing the state of the cable without in-depth investigation of the same and on the other hand of possibly checking the state of the cable, in particular to the extent that potential damage to the conductor strands when certain physical state variables occur, can be detected.

In principle, any desired state variables can be picked up with such a sensor, that is to say in principle all state variables for which sensors that can be installed in cables exist.

A preferred solution provides in this respect that the sensor picks up at least one of the state variables that may lead to the cable becoming damaged—for example if they act for a long time or if certain values are exceeded—such as radiation, temperature, tension, pressure, elongation and moisture.

With regard to the way in which the sensor is disposed with such a disposition of the information carrier unit on the intermediate sheath, no specific details have been given so far.

An advantageous solution provides that the sensor is likewise disposed on the intermediate sheath. In this case, the sensor can, for example, be placed on a surface of the intermediate sheath.

However, it is also conceivable for the sensor to be at least partly embedded in the intermediate sheath.

For the protection of the sensor, in particular while it is being applied, it is still more advantageous, however, if the sensor is predominantly embedded in the intermediate sheath, since in this way it is possible for the sensor to be largely protected, and also the connection between the sensor and, for example, the integrated circuit of the information carrier unit can be easily ensured in a stable and lasting manner in that, for example, the sensor is applied with the integrated circuit of the information carrier unit at the same time to the intermediate sheath and embedded in it. Particularly good protection is possible if the sensor is substantially completely embedded in the intermediate sheath, so that no damage to the sensor can take place when the outer sheath is applied.

However, it is also conceivable to dispose the sensor in relation to the intermediate sheath in such a way that the sensor is at least partly embedded in the outer cable sheath, in order also to be able to pick up physical state variables in the outer cable sheath.

In an extreme case, it is even advantageous to dispose the sensor completely on the surface of the intermediate sheath, and consequently embed it in the outer sheath, so that a far better connection takes place between the outer sheath and the sensor than between the sensor and the intermediate sheath.

If, however, it is intended, for example, to pick up shear forces between the outer sheath and the intermediate sheath, the sensor should be fixedly connected on one side to the intermediate sheath and on the other side to the outer sheath.

With regard to the operation of the information carrier unit and the operation of the sensor by the information carrier unit, no further details have been specified so far. An advantageous solution provides that the information carrier unit reads out the sensor in the activated state.

This means that the information carrier unit has no power supply of its own, but has to be activated by an external energy supply.

One possibility for such activation is that the information carrier unit can be activated by a read device.

Another advantageous solution provides that the information carrier unit can be activated by an electromagnetic field of a current flowing through the cable.

This solution has the advantage that no activation of the information carrier unit by the read device is required, but rather an alternating electromagnetic field which provides sufficient energy for the operation of the information carrier unit is available independently of the read device, the information carrier unit likewise picking up this energy by way of a suitable antenna.

The current flowing through the cable may, for example, be a current which is variable over time, as is used in the case of drives supplied with pulse-width-modulated current.

The current flowing through the cable may be a current flowing in a data line or a variable-frequency current, as is used in control lines for synchronous motors.

However, it is also conceivable for the current to be a conventional alternating current at a specific frequency, for example including the power-line frequency.

Furthermore, it would be possible for two lines of the cable to be connected in such a way that an electromagnetic field with the standardized carrier frequency of the information carrier units, for example 13.56 MHz, is produced. This would have the advantage that no special measures have to be taken for generating energy in the information carrier units.

In all these cases, the coupling-in of the energy takes place inductively by way of the alternating electromagnetic field produced by this alternating current into the antenna unit of the information carrier unit.

In principle, it would be sufficient to form the information carrier unit in such a way that it picks up the measured value and then transmits it immediately to the read device.

In order, however, to be able to pick up different measured values at different points in time, for example including during the transmission of other kinds of information between the read device and the information carrier unit, it is preferably provided that the information carrier unit stores the at least one measured value in a memory. In this way, the measured value can be read out at any times desired, that is to say whenever it is requested by the read device.

In particular, there is also the possibility in this respect of then picking up measured values and making them accessible later when the information carrier unit is not interacting with a read device and is, for example, activated by an electromagnetic field of a current flowing through the cable.

Since cables can be expected to have long service lives and the picking up of measured values would then produce a high volume of data, it is convenient to provide a reduction in the amount of data.

One possibility for reducing the amount of data provides that the information carrier unit only stores a measured value in the memory area if it exceeds a threshold value.

This may take place, for example, by the information carrier unit constantly picking up the measured values, but the information carrier unit being prescribed a threshold value as from which the measured values are stored, so that normal states are not stored but only the measured values which do not correspond to a normal state as defined by the threshold value.

These measured values are then stored in the simplest case as nothing more than measured values, in somewhat more complex cases as measured values with an indication of the time at which they were picked up, or with an indication of other circumstances in which these measured values were picked up.

As an alternative to this, an advantageous solution provides that the information carrier unit only stores in the memory area measured values which lie outside a statistically determined normal measured value distribution.

With regard to the regions in which the state variables are ascertained by means of the sensor, no further details have been specified so far.

One suitable solution provides that the sensor picks up at least one state variable in the cable sheath, it being possible for this to be, for example, radiation, temperature, pressure, tension or elongation.

Another advantageous solution provides that the sensor comprises state variables between the inner cable body and the cable sheath.

For example, it is possible with such a solution to pick up relative movements between the inner cable body and the cable sheath.

These relative movements may reach an order of magnitude which causes irreversible damage to the cable, for example an increase in the friction between the inner cable body and the cable sheath.

For example, these excessive relative movements may lead to a separating layer between the inner cable body and the cable sheath becoming damaged or the inner cable body becoming damaged.

These relative movements may, however, also occur as shear stresses between the inner cable body and the cable sheath and be picked up as such by a shear force sensor.

With regard to the way in which the sensor is formed, no further details have been specified so far.

It is advantageous if the sensor is a sensor which varies an electrical resistance in accordance with the physical state variable to be picked up, since an electrical resistance can be easily picked up.

An alternative or additional solution provides that the sensor is a sensor which varies a capacitance in accordance with the physical state variable to be measured, since capacitance can be easily picked up without great electrical power consumption.

Such a sensor can be realized particularly easily and at low cost by a layer structure, in particular a multilayer structure, since layer structures can be easily produced and easily adapted to the respective conditions.

With regard to the way in which the sensor is disposed in relation to the information carrier unit, furthermore, no further details have been specified.

One solution provides that the sensor is disposed outside an integrated circuit of the information carrier unit. This solution makes it possible to use the sensor, for example, for picking up tensile forces, shear forces, elongations or excessive elongations. However, it is also conceivable to use the sensor for measuring radiation, temperatures or pressure at specific points of the cable, for example in the inner cable body or in the separating layer or in the cable sheath.

Such a solution makes it necessary, however, to produce and maintain a stable and lasting electrical connection between the sensor and the integrated circuit.

For these reasons, as an alternative to this, another advantageous solution provides that the sensor is disposed on the integrated circuit. This solution has the advantage that the sensor can be produced with the integrated circuit in a simple manner and that far fewer problems occur in maintaining the sensor in working order, since the sensor and the part of the integrated circuit carrying it are fixedly connected to each other.

In the simplest case, the sensor may be provided as a component of the integrated circuit and comprises a temperature in the surroundings of the integrated circuit.

It is also conceivable, however to form the sensor as a moisture sensor, which picks up moisture occurring in the region of the integrated circuit.

With regard to the type of sensor and the way in which it is formed, no further details have been specified so far.

An advantageous exemplary embodiment provides that the sensor is a sensor which reacts irreversibly to the state variable to be picked up.

Such a sensor has the advantage that it reacts irreversibly when the state variable occurs, so that it is not necessary for the sensor, and in particular the information carrier unit, to be active at the point in time of the occurrence of the state variable to be picked up or the occurrence of the deviation in the state variable to be picked up. Rather, the sensor is capable at all later points in time of generating a measured value which corresponds to the state variable that was achieved at some point in time in the past.

As an alternative to this, it is provided that the sensor is a sensor which reacts reversibly with regard to the state variable to be picked up. In this case, it is necessary to activate the sensor when the state variable to be picked up occurs or when there is a change in the state variable to be picked up, in order to be able to pick up the measured value corresponding to this state variable.

With regard to the forming of the information carrier unit itself, no further details have been specified so far.

An advantageous embodiment provides that the information carrier unit comprises a base.

In this case, it is provided that an integrated circuit of the information carrier unit is disposed on the base.

Furthermore, it is suitably provided in this case that a conductor acting as an antenna is disposed on the base.

The antenna may in this case be produced from conductor tracks, produced by a lacquer applied to the base. Particularly advantageous is an embodiment in which the antenna is applied to the base by a printing operation.

For example, it is conceivable in the case of one embodiment for the base to be a rigid body.

The base may, for example, be a plate or at least part of an embedding body in which the integrated circuit and the conductor for the antenna are at least partially embedded.

An embedding body of this kind is, for example, of a disk like, lenticular or semi-lenticular form and at the same time provided with blunt, in particular rounded, edge regions, in order to avoid damage to its surroundings in the cable.

Consequently, the base is, for example, at least part of an embedding body enclosing the integrated circuit and the antenna.

As an alternative to this, it is provided that the base is made of a flexible material.

A flexible material of this kind could be, for example, a resiliently flexible material.

It is particularly advantageous, however, for introducing the information carrier units with the base into the cable if the flexible material is a so-called pliant material.

In order furthermore, however, to avoid damage to the integrated circuit and the conductor forming the antenna, and in particular also the terminals between the integrated circuit and the conductor forming the antenna, it is preferably provided that the flexible material is resistant to tension in at least one direction.

In all the cases in which the information carrier unit comprises a base, there is the possibility of disposing the sensor such that it is free from the base; this is advantageous in particular when good coupling of the sensor to the physical state variables to be measured is intended. For example, this is useful whenever the sensor is intended to directly pick up forces, tension, elongations or shear stresses, or else radiation or temperature or moisture, at defined points of the cable.

In these cases, however, a good and lasting electrical connection between the sensor and the components disposed on the base, in particular the integrated circuit, should be ensured.

For this reason, as an alternative to this, an advantageous solution provides that the sensor is disposed on the base. This solution has the advantage that the stability of the base can therefore be used also to position the sensor lastingly and in a stable manner in relation to the integrated circuit, and consequently to introduce the entire information carrier unit together with the sensor into the cable easily when the cable is produced, and consequently also to be able to operate it later with the necessary long-term stability.

With regard to the number of information carrier units per cable, no further details have been specified so far.

An advantageous embodiment provides that one information carrier unit is disposed for each cable. This has the disadvantage, however, that there is then the problem of using the read device to find the one information carrier unit of the cable in order to read out the information stored in it.

For this reason, it is advantageously provided that a multiplicity of information carrier units are disposed on the carrier strand.

When a number of information carrier units with sensors are used, it is intended that the information carrier units can be selectively used, for example in order to assign different information to specific portions of the cable.

One conceivable solution for assigning different information to different portions of the cable would be to assign the measured values of the respective sensor and also a different indication of the length, so that, by reading out the measured value with the specified length of an information carrier unit, for example, the measured value can be assigned to a position at this distance from one of the ends of the cable or from both ends of the cable.

It is in particular advantageous if each of the information carrier units can be individually addressed by an access code.

The multiple information carrier units could in principle be disposed at any desired intervals on the carrier strand.

In order to make it possible for the information carrier units to be reliably found, it is preferably provided that the information carrier units are disposed at defined regular intervals in the longitudinal direction of the cable.

The defined regular intervals could also specify variable distances, for example shorter distances at the ends of the cable that increase toward the middle.

In the simplest case, however, it is suitable if the defined regular intervals for the information carrier units determine a uniform distance between the information carrier units in the longitudinal direction of the cable.

Furthermore, the information carrier units have, in the longitudinal direction of the cable, a reading/writing range, which depends on the frequency at which they are operated and also how the antenna is formed.

In order to avoid multiple reading out by multiple information carrier units, and consequently misinterpretation of the data read out, when the information carrier units are addressed by the read device, it is preferably provided that the information carrier units are disposed at the regular intervals in relation to one another in such a way that the distances between the information carrier units correspond to at least 2 times a reading/writing range of the information carrier units in the direction of each nearest information carrier unit.

It is still better if the distances correspond to at least 2.5 times the reading/writing range of the information carrier units in the direction of the nearest information carrier unit.

Further features and advantages of the invention are the subject of the description and of the pictorial representation of some exemplary embodiments.

Figure 1:
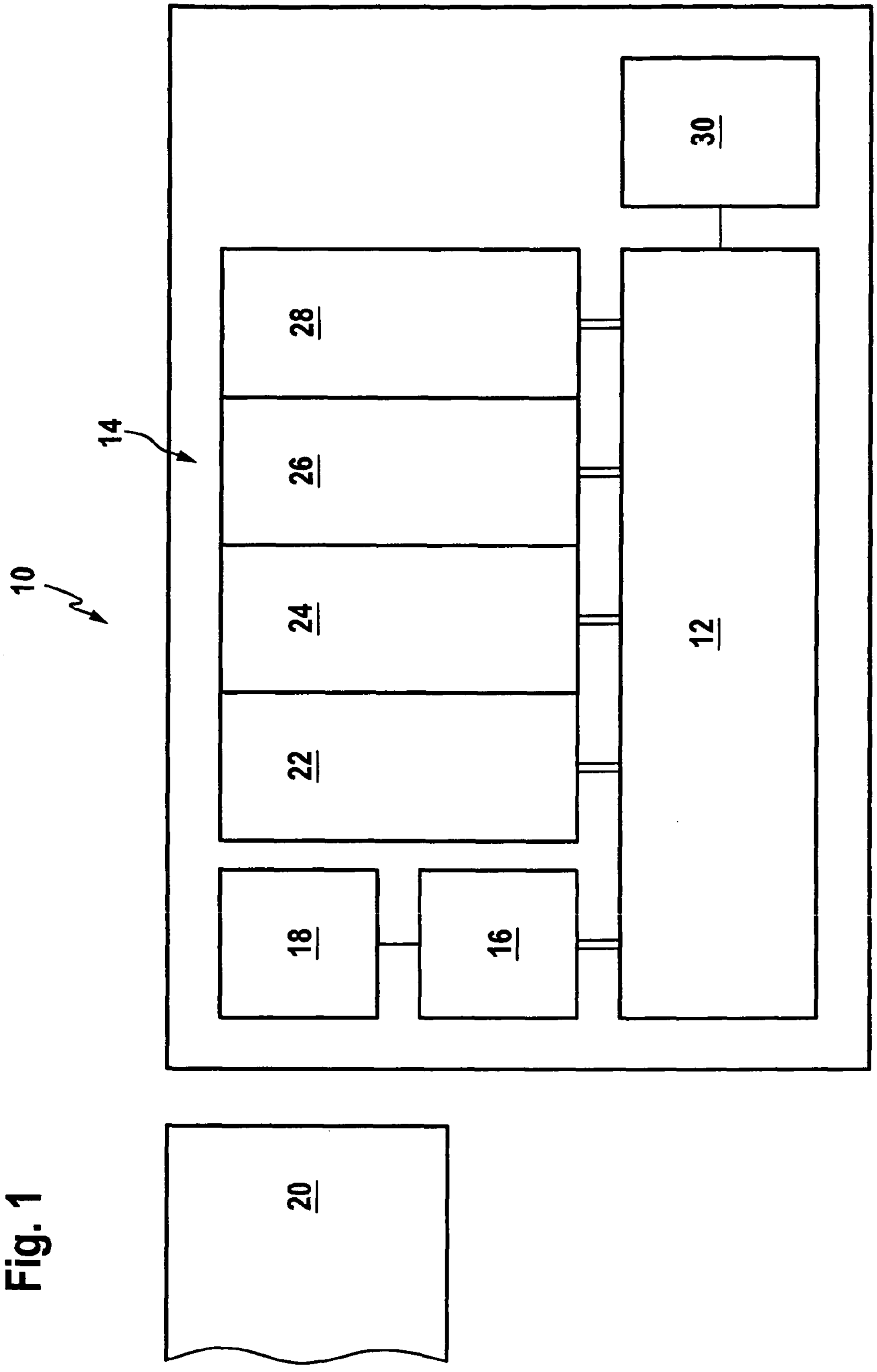
FIG. 1 shows a schematic block diagram of a first exemplary embodiment of an information carrier unit according to the invention.

An exemplary embodiment of an information carrier unit 10 to be used according to the invention and represented in FIG. 1 comprises a processor 12, to which a memory designated as a whole by 14 is linked, the memory preferably being formed as an EEPROM.

Also connected to the processor 12 is an analog part 16, which interacts with an antenna unit 18.

When there is electromagnetic coupling of the antenna unit 18 to a read device designated as a whole by 20, the analog part 16 is then capable on the one hand of generating, with the required power, the electrical operating voltage that is necessary for the operation of the processor 12 and the memory 14, as well as the analog part 16 itself, and on the other hand of making available to the processor 12, the information signals transmitted by electromagnetic field coupling at a carrier frequency or transmitting information signals generated by the processor 12 by way of the antenna unit 18 to the read device 20.

A very wide variety of carrier frequency ranges are possible thereby.

In an LF range of approximately 125 to approximately 135 kHz, the antenna unit 18 acts substantially as a second coil of a transformer formed by the antenna unit and the read device 20, energy and information transmission taking place substantially by way of the magnetic field.

In this frequency range, the range between the read device 20 and the antenna unit 18 is low, that is to say that, for example, the mobile read device 20 must be brought up very close to the antenna unit 18, to within less than 10 cm.

In an HF range between approximately 13 and approximately 14 MHz, the antenna unit 18 likewise acts substantially as a coil, good energy transmission with a sufficiently great range being possible as before in the interaction between the antenna unit 18 and the read device 20, the distance being, for example, less than 20 cm.

In the UHF range, the antenna unit 18 is formed as a dipole antenna, so that, when the power supply to the information carrier unit 10 does not take place by way of the read device 20, a great range in the communication with the read device 20 can be realized, for example up to 3 m, the interaction between the read device 20 and the antenna unit 18 taking place by way of electromagnetic fields. The carrier frequencies are from approximately 850 to approximately 950 MHz or from approximately 2 to approximately 3 GHz or from approximately 5 to approximately 6 GHz. When the power is supplied by the mobile read device 20, the communication range is up to 20 cm.

Depending on the frequency range, therefore, the antenna units 18 are also differently formed. In the LF range, the antenna unit 18 is formed as a compact, for example wound, coil with an extent which may even be less than one square centimeter.

In the HF range, the antenna unit 18 is likewise formed as a flat coil, which may also have a greater extent of the order of several square centimeters.

In the UHF range, the antenna unit 18 is formed as a dipole antenna of diverse configuration.

The memory 14 interacting with the processor 12 is preferably divided into a number of memory areas 22 to 28, which can be written to in various ways.

For example, the memory area 22 is provided as a memory area which can be written to by the manufacturer and, for example, carries an identification code for the information carrier unit 10. This identification code is written in the memory area 22 by the manufacturer, and at the same time the memory area 22 is write-protected.

The memory area 24 can, for example, be provided with write protection which can be activated by the cable manufacturer, so that the cable manufacturer has the possibility of writing to the memory area 24 and securing the information in the memory area 24 by write protection. In this way, the processor 12 has the possibility of reading and outputting the information present in the memory area 24, but the information in the memory area 24 can no longer be overwritten by third parties.

For example, the information stored in the memory area 24 may be information concerning the kind or type of cable and/or technical specifications of the cable.

In the memory area 26 information is stored, for example by the purchaser of the cable, and write-protected. Here there is the possibility for the purchaser and user of the cable to store information concerning the installation and use of the cable and secure it by write protection.

In the memory area 28, information can be freely written and freely read, so that this memory area can be used for storing and reading information during the use of the information carrier unit in conjunction with a cable.

The exemplary embodiment of the information carrier unit 10 represented in FIG. 1 as a block diagram is a so-called passive information carrier unit, and consequently does not require an energy store, in particular an accumulator or battery, in order to interact and exchange information with the read device 20.

Figure 2:
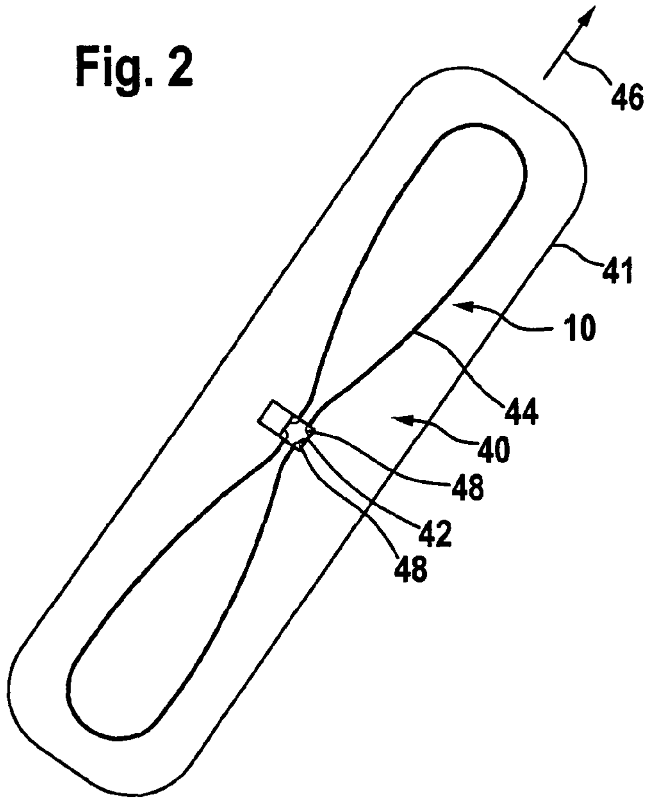
FIG. 2 shows a representation of how the first exemplary embodiment of the information carrier unit according to the invention is realized.

A way of realizing the first exemplary embodiment of the information carrier unit 10 according to the invention that is represented in FIG. 2 comprises a base 40, disposed on which is an integrated circuit 42, which has the processor 12, the memory 14 and the analog part 16, as well as conductor tracks 44, on the base 40, which form the antenna unit 18. The conductor tracks 44 may in this case be applied to the base 40 by means of any desired form-selective coating processes, for example in the form of printing-on a conductive lacquer or a conductive paste or in the form of a wire loop.

If the information carrier unit 10 is of a great extent in a first direction 46, the base 40 is, for example, produced from a flexible material, in particular a pliant material, for example a plastics strip, to which on the one hand the conductor track 44 can be easily and permanently applied by coating and on the other hand, the integrated circuit 42 can also be easily fixed, in particular in such a way that a lasting electrical connection can be realized between external connecting points 48 of the integrated circuit 42 and the conductor tracks 44.

If the base 40 is formed as flat material, it is of advantage if it is formed with edge regions 41 with a blunt effect on their surroundings, in order to avoid damage to the surroundings of the base 40 in the cable during movement of the cable. This means in the case of a base 40 formed from a thin flat material that it has, for example, rounded corner regions and, if possible, also edges with a blunt effect, for example deburred edges.

Figure 3:
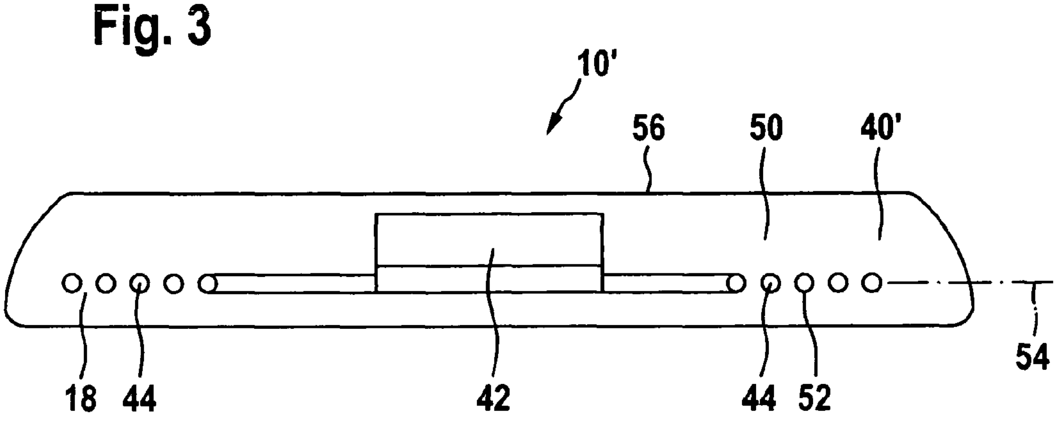
FIG. 3 shows a second exemplary embodiment of an information carrier unit according to the invention, which corresponds with regard to its function to the structure of the first exemplary embodiment.

In the case of a second exemplary embodiment, represented in FIG. 3, the information carrier unit 10 is formed as a disk-shaped rigid body.

The base 40' is in this case formed by an embedding compound forming an embedding body 50, for example of resin or a plastics material, in which the integrated circuit 42 and the conductor tracks 44, which form the antenna unit 18, are embedded, the conductor tracks 44 forming annular coil windings 52, for example, which lie in a plane 54 and are completely embedded in the embedding body 50.

The embedding body 50 is provided with edge regions 51 with a blunt effect on the surroundings in the cable, which cannot cause any damage in the cable, even during bending of the cable, because of their rounding, a lenticular cross-sectional shape being formed.

In this case, the embedding body 50 may have a disk-like shape with rounded edge regions 51, a lenticular shape or a semilenticular shape.

Consequently, the antenna unit is intended for example for the HF range, in which the antenna unit 18 operates in a way similar to a second coil of a transformer.

Figure 4:
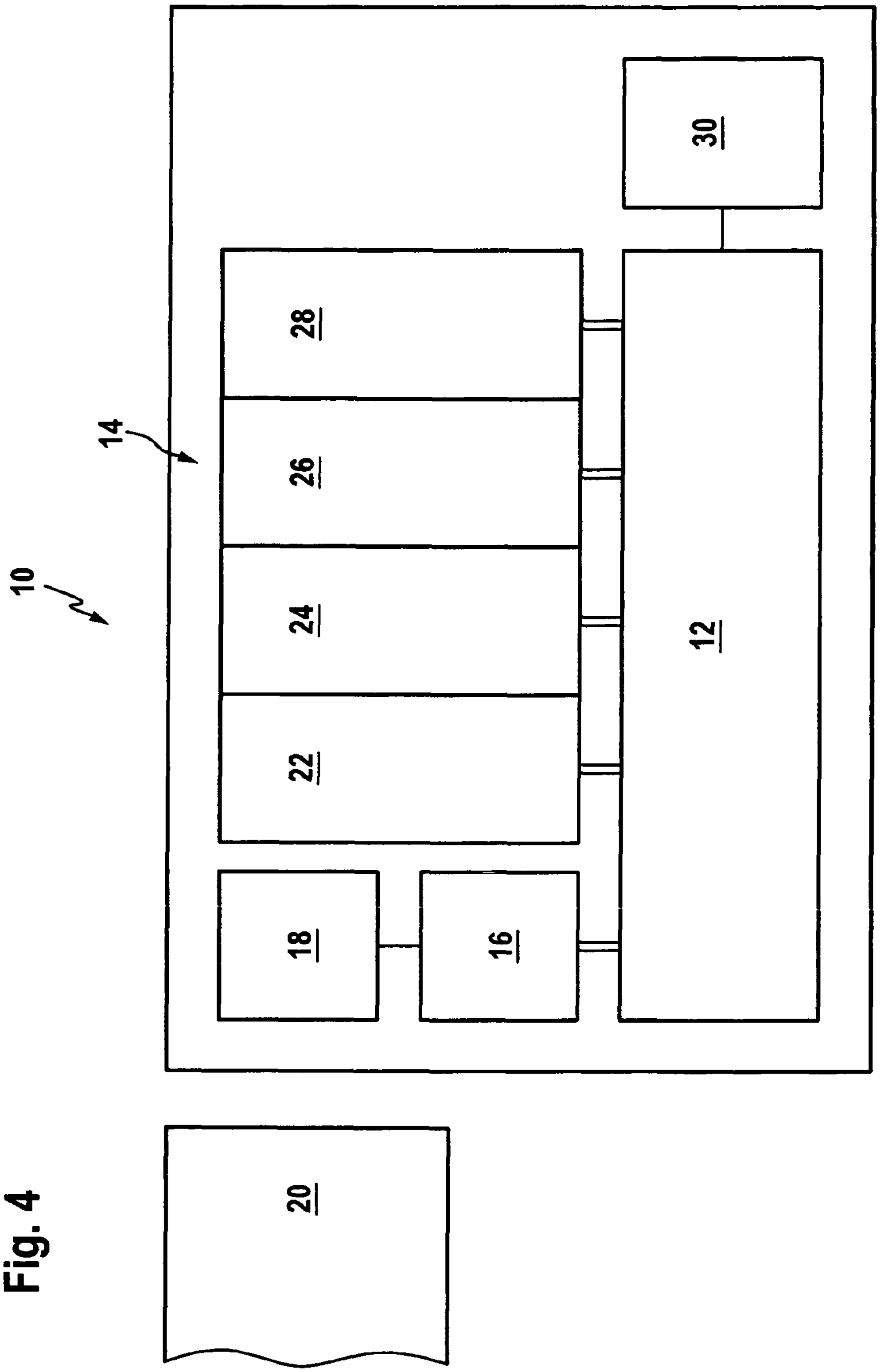
FIG. 4 shows a schematic block diagram of a third exemplary embodiment of an information carrier unit according to the invention.

In the case of a third exemplary embodiment of an information carrier unit 10" according to the invention, represented in FIG. 4, those elements that are identical to those of the first exemplary embodiment are provided with the same reference numerals, so that, with regard to the description of the same, reference can be made to the first exemplary embodiment in its entirety.

By contrast with the first and second exemplary embodiments, in the case of the third exemplary embodiment, a sensor 30 is also associated with the processor 12, enabling the processor 12 to pick up physical variables of the cable, such as for example radiation, temperature, pressure, tension, elongation or moisture, and for example store corresponding values in the memory area 28.

The sensor 30 may in this case be formed in accordance with the field of use.

For example, it is conceivable to form the sensor 30 for measuring a pressure, as a pressure-sensitive layer, it being possible for the pressure sensitivity to take place for example by way of a resistance measurement or, in the case of multiple layers, a capacitive measurement.

As an alternative to this, it is, for example, conceivable, for forming the sensor as a temperature sensor, to form the sensor as a resistor that is variable with the temperature, so that a temperature measurement is possible by a resistance measurement.

If the sensor is formed as a tension or elongation sensor, the sensor is formed, for example, as a strain gage, which changes its electrical resistance in accordance with elongation.

If, however, the sensor is formed as a sensor reacting irreversibly to a specific elongation or to a specific tension, it is likewise possible to form the sensor as a sensor breaking an electrical connection, for example as a wire or conductor track for which the electrical connection is interrupted as from a specific tension of a specific elongation, by rupturing at a predetermined breaking point or by tearing, or goes over from a low resistance to a high resistance.

If appropriate, however, the tension measurement or the elongation measurement could also be realized by a capacitive measurement.

In the case of a moisture sensor, the sensor is preferably formed as a multilayer structure which changes its electrical resistance or its capacitance in accordance with moisture.

Otherwise, the third exemplary embodiment according to FIG. 4 operates in the same way as the first exemplary embodiment.

The sensor 30 is active whenever the information carrier unit 10 is activated by the read device 20, so that sufficient power is available to operate the sensor 30 also.

During the activation of the information carrier unit 10, the sensor 30 is consequently capable of transmitting measured values to the processor 12, which then stores these measured values, for example in the memory area 28, and reads them out whenever they are requested by the read device 20.

Figure 5:
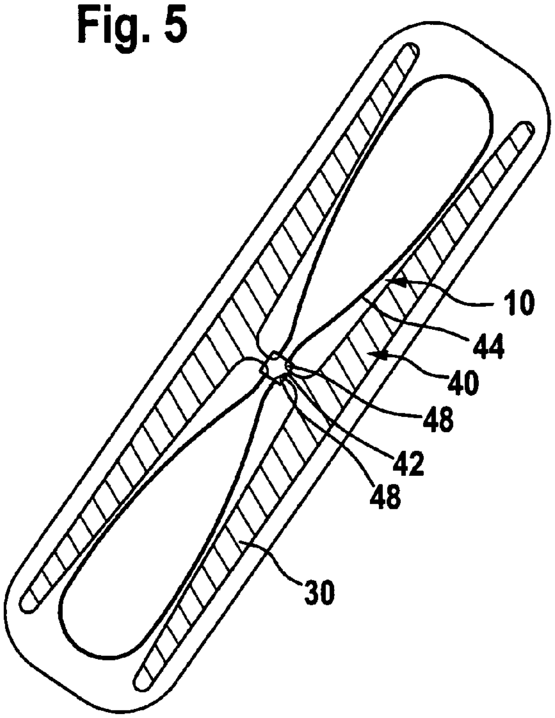
FIG. 5 shows a representation of how the third exemplary embodiment of the information carrier unit according to the invention is realized.

A way of realizing the third exemplary embodiment of the information carrier unit 10 according to the invention that is represented in FIG. 5 comprises the base 40, disposed on which is an integrated circuit 42 that has the processor 12, the memory 14 and the analog part 16, as well as conductor tracks 44, on the base 40, which form the antenna unit 18. The conductor tracks 44 are applied to the base 70 by means of any desired [lacuna] in the form of printing-on a conductive lacquer or a conductive paste.

Also disposed on the base 40 is the sensor 30 in the form of a multilayer structure 55 disposed around the antenna, which in the case of this exemplary embodiment is, for example, a space-saving capacitive moisture sensor, so that the sensor 30 may likewise be disposed either directly next to the integrated circuit 42 or be part of the integrated circuit 42.

On account of its state-dependent capacitance, the capacitive sensor of the first exemplary embodiment may, as an alternative to the moisture sensor, also be formed as a temperature sensor or a pressure sensor.

Figure 6:
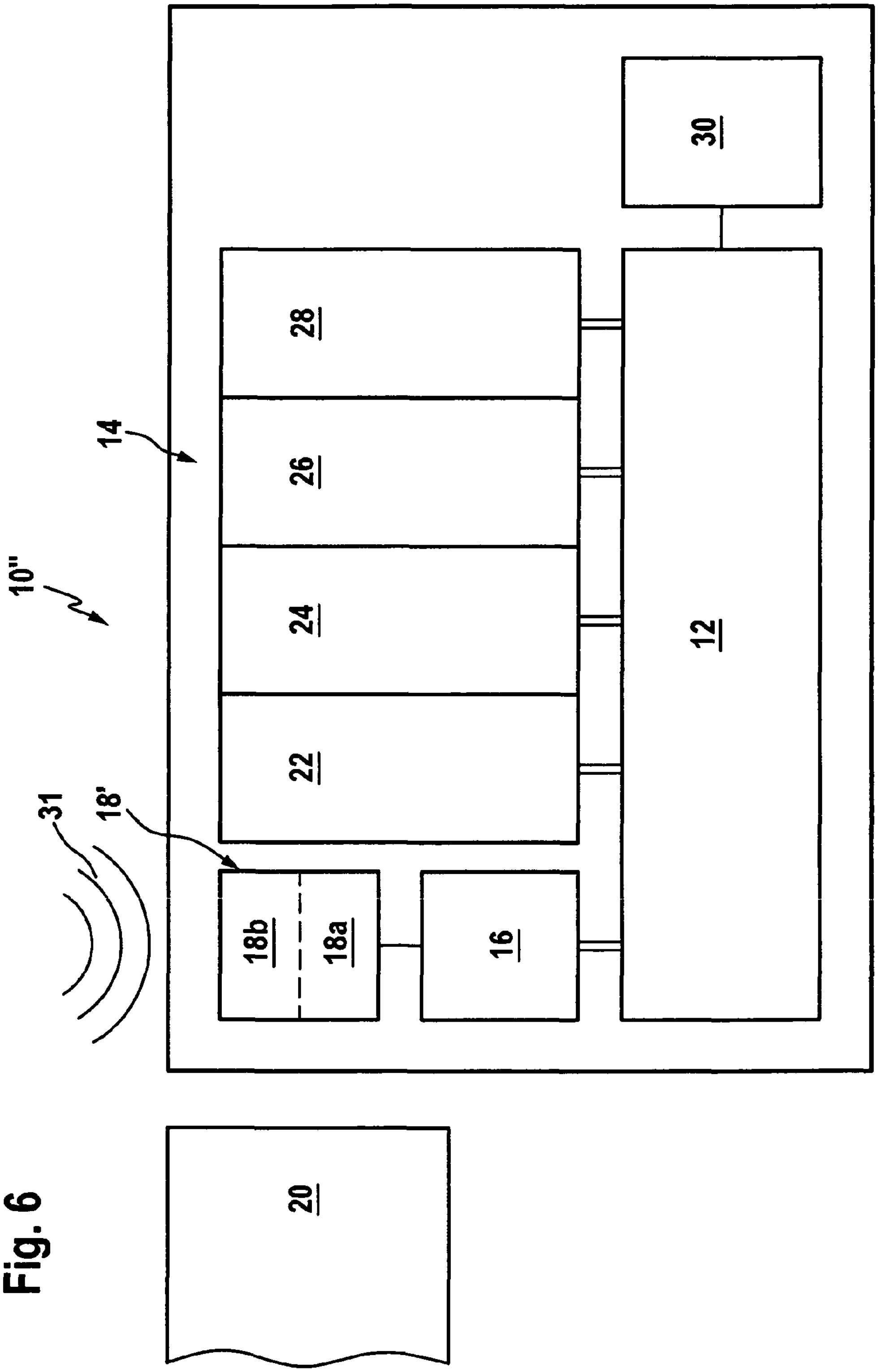
FIG. 6 shows a schematic block diagram of a fourth exemplary embodiment of the information carrier unit according to the invention.

By contrast with the previous exemplary embodiments, in the case of a fourth exemplary embodiment 10", represented in FIG. 6, an antenna unit 18' is associated with the analog part 16, the antenna unit having a two-part effect, to be specific for example an antenna part 18*a*, which communicates in the usual way with the read device 20, and an antenna part 18*b*, which is capable of coupling to an alternating magnetic field 31 and drawing energy from it, in order to operate the information carrier unit 10 independently of the read device 20 with this energy drawn from the alternating magnetic field 31.

For example, the alternating electromagnetic field 31 can be produced by the leakage field of a data line, a control line, a pulsed current line or an alternating current line which is connected, for example, to an AC voltage source with 50 Hz or a higher frequency. It is in this way possible to supply the information carrier unit 10" with energy as long as the alternating field 31 exists, irrespective of whether the read device 20 is intended to be used for writing or reading information.

The frequency of the alternating field 31 and a resonant frequency of the antenna part 18*b* can be made to match each other in such a way that the antenna part 18*b* is operated in resonance, and consequently allows optimum coupling-in of energy from the alternating field 31.

Supplying the information carrier unit 10 with electrical energy in such a way, independently of the read device 20, is useful in particular if the sensor 30 is intended to be used over relatively long time periods for picking up a physical state variable which is not intended to coincide with the time period during which the read device 20 is coupled to the antenna unit 18*a* but to be independent of it.

Consequently, for example, the information carrier unit 10 can be activated by switching on the alternating electromagnetic field 31, so that physical state variables can be measured by the sensor 30 and picked up by way of the processor 12, and for example stored in the memory area 28, independently of the question as to whether or not the read device 20 is coupled with the antenna unit 18.

With an information carrier unit 10" of this kind, there is the possibility of carrying out measurements with the sensor 30 over long time periods, so that also a large number of measured values arise, which leads to a large amount of data if all the measured values are stored.

For this reason, a selection of the measured values is made by the processor 12 on the basis of at least one selection criterion in order to reduce the amount of data in the memory area 28.

One selection criterion is, for example, a threshold value which specifies that a measured value is stored if the threshold value is exceeded, so that in this way the amount of data is drastically reduced.

Another selection criterion may also be a statistical distribution, so that only measured values which deviate significantly from a previously determined statistical distribution are stored, and consequently the amount of data is also reduced as a result.

Figure 7:
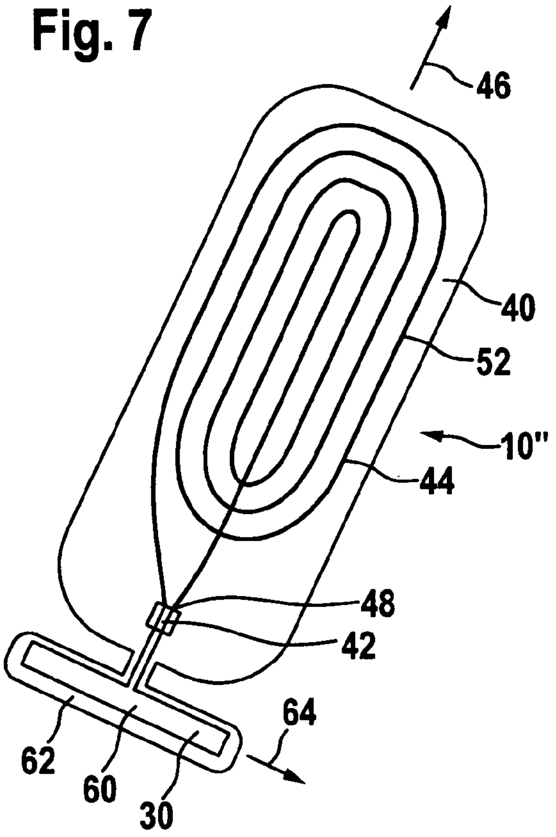
FIG. 7 shows a representation of how the fourth exemplary embodiment of the information carrier unit according to the invention is realized.

A way of realizing the fourth exemplary embodiment of the information carrier unit 10''', that is represented in FIG. 7, comprises a base 40, which is formed in the same way as in the case of the first exemplary embodiment.

Also disposed on the base 40 are the integrated circuit 42 and the conductor tracks 44, which, in the case of this exemplary embodiment, form coil windings 52.

In the case of this exemplary embodiment, however, the sensor 30 is formed as a strain gage 60, which in the case of this exemplary embodiment is disposed on a substrate 62 that is connected to the base 40 and can be elongated in a longitudinal direction 64 of the strain gage 60.

In the case of this exemplary embodiment, the longitudinal direction 64 runs transversely to the direction 46, which represents a longitudinal direction of the base 40.

Consequently, provided that the strain gage 60 is fixedly connected to a component part of the cable that can undergo elongation, in the case of this information carrier unit 10''', it is possible for elongations in the longitudinal direction 64 of the strain gage to be measured and to be picked up by the processor 12 on the integrated circuit 42.

An information carrier unit corresponding to the exemplary embodiments described above can be used according to the invention in different variants for a cable.

Figure 8:
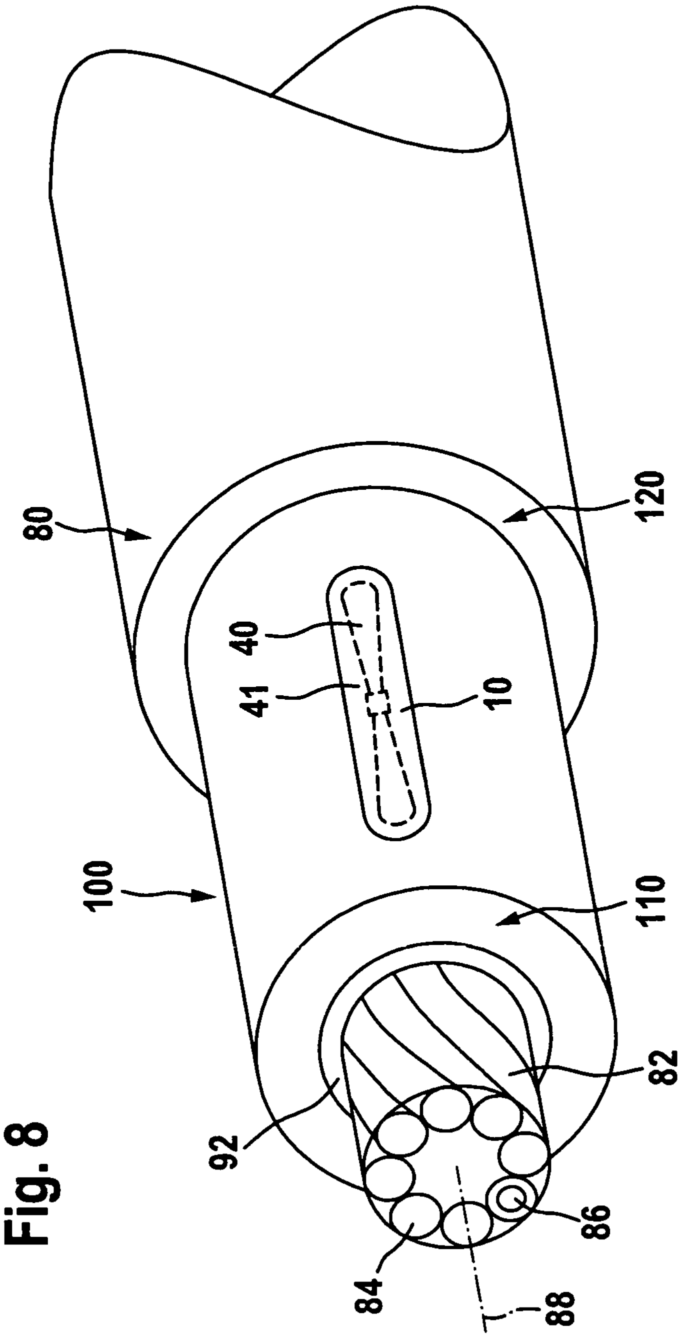
FIG. 8 shows a perspective representation of a first exemplary embodiment of a cable according to the invention.

A first exemplary embodiment of a cable 80 according to the invention, represented in FIG. 8, comprises an inner cable body 82, in which a number of electrical conductor strands 84 run, the electrical conductor strands 84 respectively comprising, for example, a core 86 of an electrical conductor, which is insulated.

In this case, the electrical conductor strands 84 are preferably twisted with one another about a longitudinal axis 88, that is to say they lie disposed about the longitudinal axis 88 and run at an angle to a parallel to the longitudinal axis 88 that intersects the respective conductor strand 84.

The inner cable body 82 is enclosed over its entire extent in a longitudinal direction 90 of the cable 80 by a separating layer 92, which separates the inner cable body 82 from a cable sheath 100 that encloses the inner cable body 82 and forms an outer surface 102 of the cable.

The cable sheath 100 is formed by an intermediate sheath 110 and an outer sheath 120, it being possible, but not necessary, for the separating layer 92 to be provided between the inner cable body 82 and the intermediate sheath 140.

If it is made sufficiently thick, an intermediate sheath 110 of this kind makes it possible, in spite of a very undulating surface 85 of the inner cable body 82, caused by the twisted conductor strands 84 and the resultant interstices, which also cannot be completely compensated by inserted interstitial cords, to create a substantially non-undulating or smooth surface 112 for the information carrier unit 10, in particular such a surface according to the first, third or fourth exemplary embodiment, so that no impairment of the information carrier unit 10 can occur due to the undulating surface 85 during the bending of the cable 80, in particular impairment of the durability of the connections in the region of the external connecting points 48 and the durability of the conductor track 44 on the base 40.

The intermediate sheath 110 has, for example, a thickness which is greater than that of the outer sheath 120, so that the outer sheath 120 primarily performs an outer protective function for the intermediate sheath 110.

Figure 9:
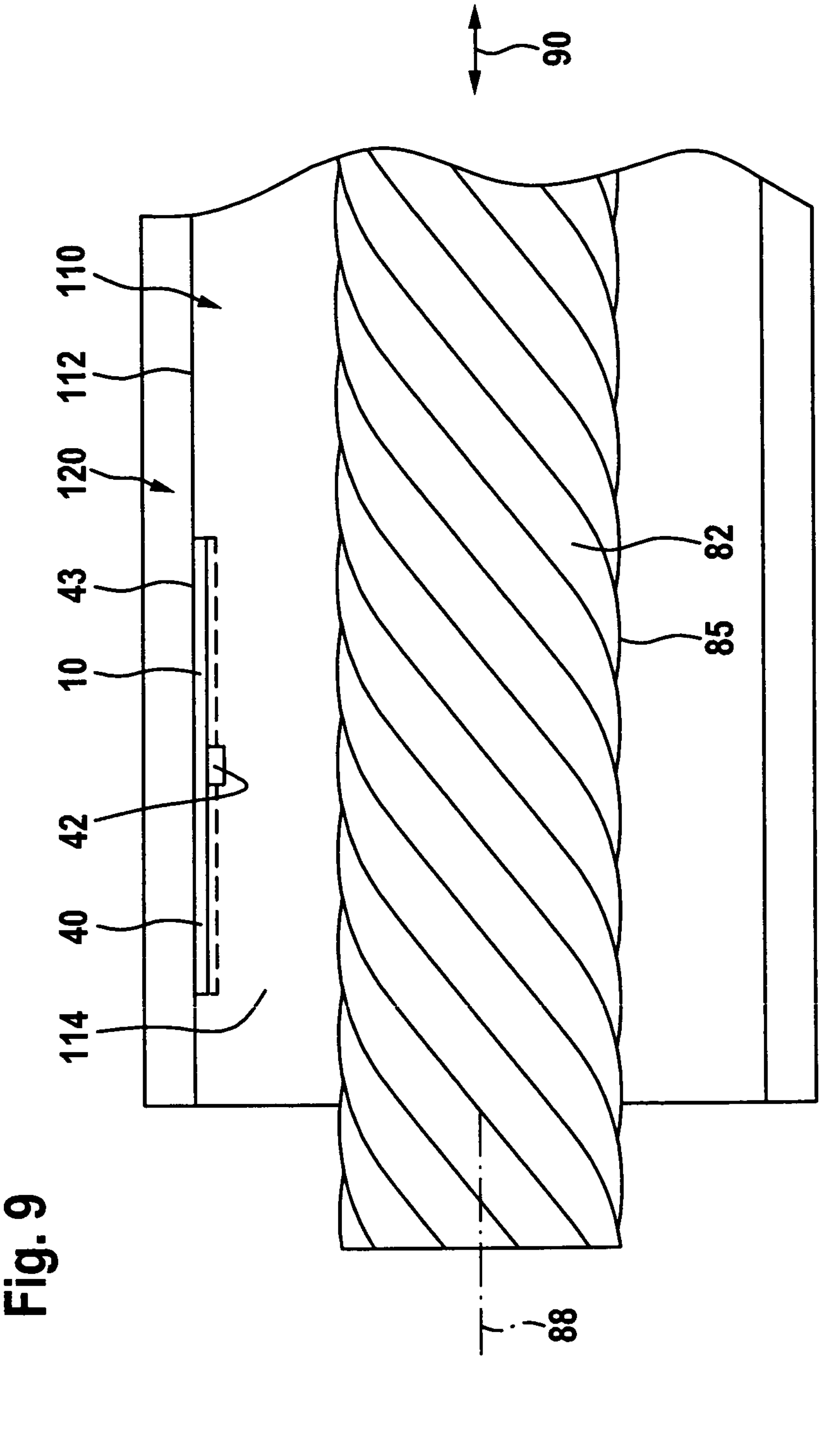
FIG. 9 shows a cross-section through the first exemplary embodiment of the cable according to the invention in the region of the inner cable body and the separating layer.

As represented in FIGS. 8 and 9, an information carrier unit 10 according to the first exemplary embodiment is placed in the intermediate sheath 110, the base 40 lying with a side 43 that is opposite from the integrated circuit 42 such that it finishes approximately with an outer surface 112 of the intermediate sheath 110, so that the information carrier unit 10 does not substantially protrude beyond the outer surface 142 of the intermediate sheath 140.

Consequently, both the base 40 and, in particular, the integrated circuit 42 are preferably at least partially embedded in the intermediate sheath 110, and the outer sheath 120 merely serves once again as an outer covering over the intermediate sheath 110 with the information carrier unit 10, and consequently also protects, in particular, the information carrier unit 10.

Preferably, the entire information carrier unit 10 is embedded into the intermediate sheath 110, and thereby also fixed, to such an extent that the entire information carrier unit 10 is applied to the outer surface 112 in the softened state of the material of the intermediate sheath 110 and is pressed into the intermediate sheath 110 to such an extent that the side 43 of the base 40 is substantially flush with the outer surface 112 of the intermediate sheath 110.

In this case, the base 40 not only represents a carrier for the circuit 42 and the antenna unit 18, in particular the conductor tracks 44 of the same, so that the integrated circuit 42 and the conductor tracks 44 along with the base 40 can be placed as a unit on the intermediate sheath 110 in the softened state and pressed on, but also at the same time represents external protection for the integrated circuit 42 and the conductor tracks 44.

As a result of the material of the intermediate sheath 110 that is in the softened state when the information carrier unit 10 is applied to the intermediate sheath 110, substantially the full surface area of the latter comes to lie not only against the integrated circuit 42 but also against the conductor tracks 44 and the base 40 and bonds with them, so that an intimate bond between the intermediate sheath 110 and the information carrier unit 10 is obtained, whereby the information carrier unit 10 is on the one hand fixed to the intermediate sheath 110 and furthermore additional stabilization of the position of the circuit 42 and the conductor tracks 44 in relation to the base also takes place, so that even bending of the cable 80 is not harmful to the information carrier unit 10 in the intermediate sheath 110.

Also lying between the information carrier unit 10 and the inner cable body 82 is a material layer 114 of the intermediate sheath 110 which prevents uneven pressure of the undulating surface 85 on the information carrier unit 10, in particular during the moving of the cable 80.

It is also ensured by the blunt edge regions 41 of the base 40 that no damage to the intermediate sheath 110 or the outer sheath 120 occurs during bending of the cable 80.

If, for example, the information carrier unit is provided with a sensor 30 according to the third exemplary embodiment corresponding to FIG. 5, it is possible, for example, for the sensor 30 to pick up externally acting physical radiation, the temperature or the moisture in the cable sheath 100', in particular in the region of the intermediate sheath 110.

If the sensor 30 is formed according to the fourth exemplary embodiment corresponding to FIGS. 6 and 7, tension or elongation in the cable sheath 100 can be picked up if the substrate 62 is fixed to the intermediate sheath 110 and follows elongational movements of the same.

It is consequently possible, for example, to sense mechanical overloading of the cable sheath 100.

In particular, in the case of this exemplary embodiment, the outer sheath 120 is produced from a transparent material, so that the position of the information carrier unit 10 on the intermediate sheath 110 can be seen from the outside, in particular when the base 40 is of a color that is distinctly different from the color of the material of the intermediate sheath 140.

Figure 10:
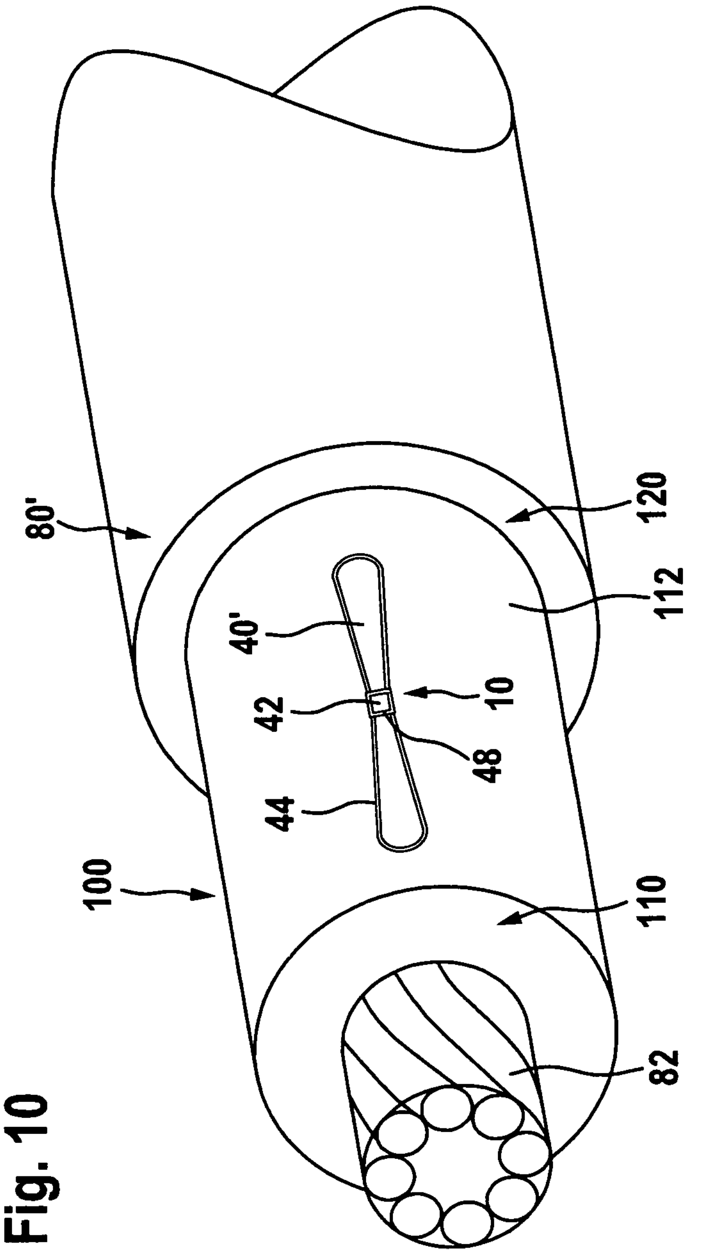
FIG. 10 shows a perspective representation similar to FIG. 8 of a second exemplary embodiment of the cable according to the invention.
Figure 11:
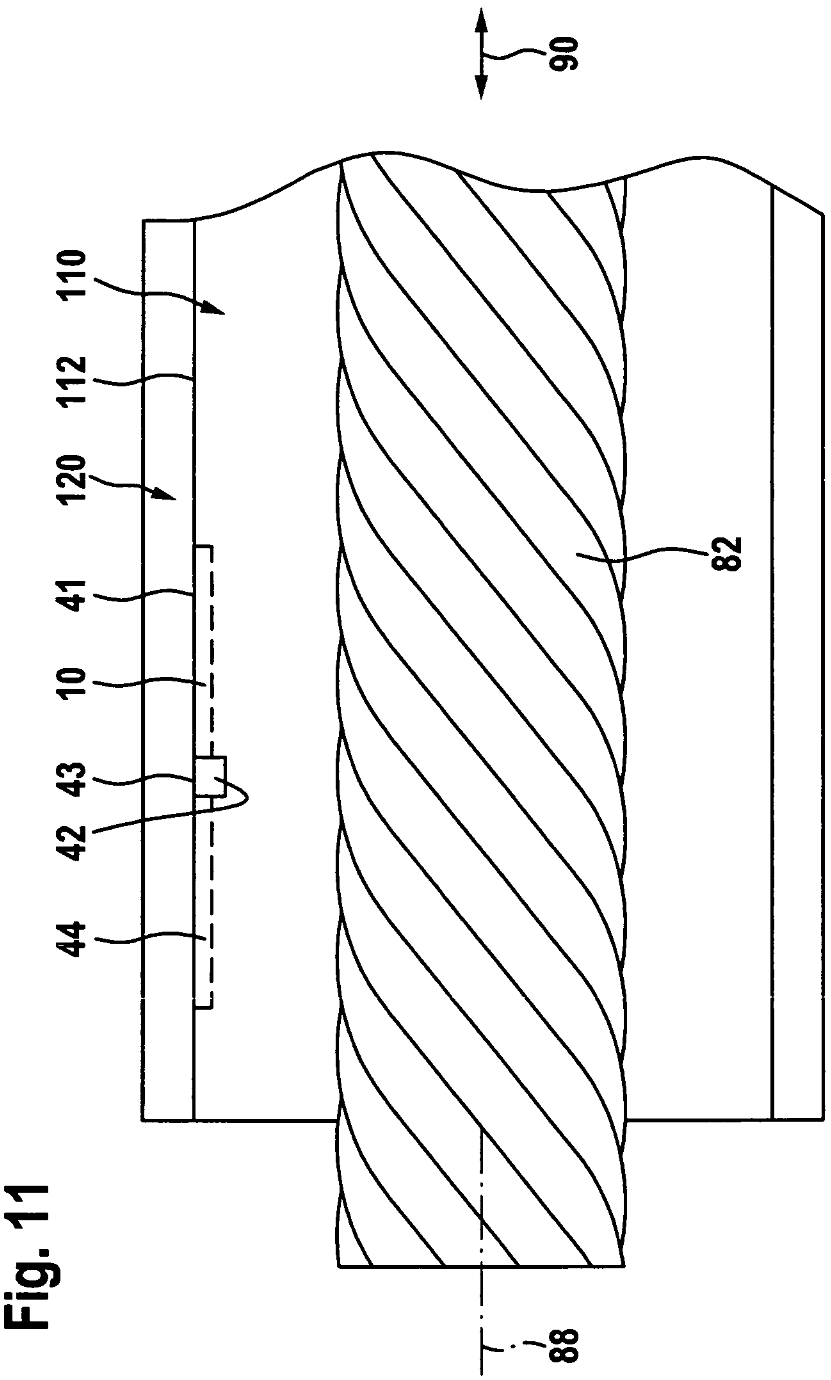
FIG. 11 shows a sectional representation similar to FIG. 9 of the second exemplary embodiment of the cable according to the invention.

In the case of a second exemplary embodiment of a cable 80' according to the invention, represented in FIGS. 10 and 11, by contrast with the first exemplary embodiment of the cable 80 according to the invention, represented in FIGS. 8 and 9, the information carrier unit 10 is formed according to the first exemplary embodiment or the third exemplary embodiment but no longer comprises a base 40.

Rather, in the case of this exemplary embodiment, a partial region of the intermediate sheath 110 that accommodates the information carrier unit 10 forms the base 40', the integrated circuit 42 of the information carrier unit 10 likewise being embedded into the intermediate sheath 110, so that one side 43 of the same is approximately flush with the outer surface 112 of the intermediate sheath 110.

In this case, too, the integrated circuit 42 is inserted into the intermediate sheath 110 in a state in which the material of the intermediate sheath 110 is softened, so that it can accommodate the integrated circuit 42 and enclose the same apart from the side 43.

In this way the integrated circuit 42 is fixed in the intermediate sheath 110 by being positively embedded, while the adhesive action of the material of the intermediate sheath 110 that is in the softened state also makes it possible for the integrated circuit 42 to be fixed in the intermediate sheath 110 with a material bond.

The antenna unit 18 is formed by applying the conductor tracks 44 directly to the outer surface 112 of the intermediate sheath 110, it being possible, for example, for this to take place by applying a conductive lacquer or a conductive paste to the outer surface 112 of the intermediate sheath 110. After the application of the conductive paste or the conductive lacquer for forming the conductor tracks 44, contacting of the integrated circuit 42 in the region of its connecting points 48 also takes place by placing it in position.

If the conductive paste or the conductive lacquer for forming the conductor tracks 44 is applied while the material of the intermediate sheath 110 is still in a softened state, they can also be pressed into or impressed in the intermediate sheath 110 to such an extent that the conductor tracks 44 are also approximately flush with the outer surface 112 of the intermediate sheath 110, and consequently are disposed in such a way that they are protected by being at least partially embedded in the intermediate sheath 110, in order to ensure sufficient protection for the conductor tracks 44 that are located directly on the intermediate sheath 110, when the outer sheath 120 is applied.

As an alternative to this, in the softened state of the material of the intermediate sheath 110, it is possible to introduce recesses for accommodating the conductor tracks 44 and the integrated circuit 42 into the intermediate sheath 110, into which recesses the conductive paste or the conductive lacquer and the integrated circuit 42 are then introduced.

A conductive adhesive may also additionally produce a positive material bond between the connecting points 48 and the conductive paste or the conductive lacquer for forming the conductor tracks 44, so that the latter are not only disposed sufficiently well in relation to the intermediate sheath 110 but also with sufficient precision and security in relation to the integrated circuit 42, in particular the connecting points 48 thereof. This ensures lasting and reliable electrical contacting between the connecting points 48 of the integrated circuit 42 and the conductor tracks 44, so that the intermediate sheath 110 as a whole offers the same durability in its function as a base 40' for the information carrier unit 10 as the provision of a base 40.

The advantage of this solution is that, during the production of the second exemplary embodiment of the cable according to the invention, it is necessary merely for the conductor tracks 44 and additionally the integrated circuit 42 to be provided on the intermediate sheath 110, in a simple manner, and fixed, it being possible for the conductor tracks 44 to be applied, for example, by a printing device or an impressing or pressing device and for the integrated circuit 42 to be fixed, for example, by a component placing device.

Figure 12:
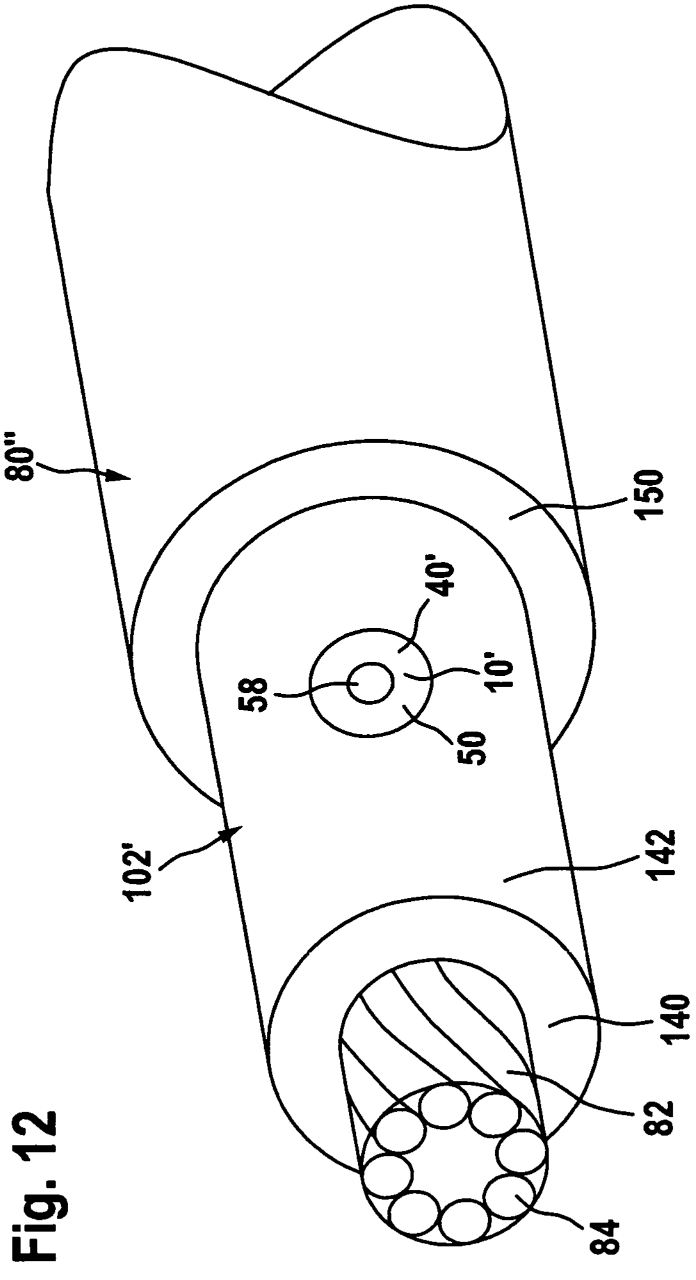
FIG. 12 shows a perspective representation similar to FIG. 8 of a third exemplary embodiment of the cable according to the invention.
Figure 13:
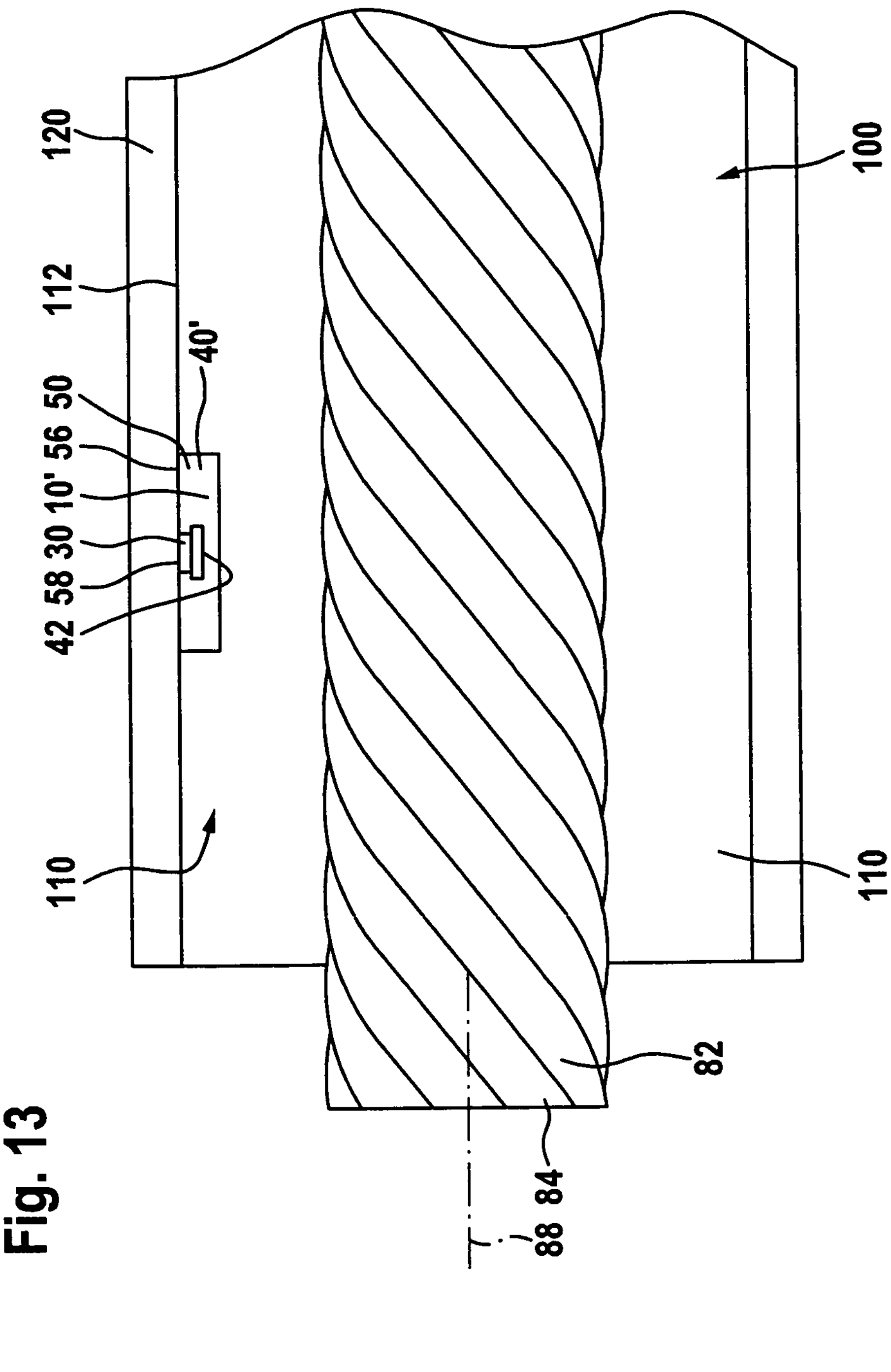
FIG. 13 shows a sectional representation similar to FIG. 9 of the third exemplary embodiment of the cable according to the invention.

However, an information carrier unit 10' according to the second exemplary embodiment can also be integrated in the intermediate sheath 110 of a third exemplary embodiment of the cable 80" according to the invention, as represented in FIG. 12 and FIG. 13.

The carrier 40 is in this case likewise embedded such that it is partially enclosed in the intermediate sheath 110, to be precise in such a way that the side 56 of the carrier and a sensor surface 58 of a sensor 30 according to the third or fourth exemplary embodiment that is provided in the embedding body 50 are approximately flush with the outer surface 112 of the intermediate sheath 110, and consequently do not substantially protrude beyond the intermediate sheath 110, so that the outer sheath 120 can likewise cover over both the intermediate sheath 110 and the information carrier unit 10'.

If, for example, the sensor 30 is a moisture sensor, it is possible to detect with the sensor surface 58 the penetration of moisture through the outer sheath 120 at an early stage, even in the cable sheath 100, before any moisture at all has reached the inner cable body 82, so that measures which prevent the cable 80" from being damaged by moisture penetrating into the inner cable body 82 can be taken at an early stage.

Even if the overall size of the information carrier unit 10' is such that it cannot be embedded in the intermediate sheath 110 within the outer surface 112, but still protrudes beyond the outer surface 142 of the intermediate sheath 110, there is still the possibility of achieving adequate coverage of the information carrier unit 10', and consequently protection of said unit from external effects, by the outer sheath 120.

The fixing of the information carrier unit 10' in the case of the third exemplary embodiment according to FIGS. 12 and 13 likewise takes place by the information carrier unit 10' being pressed into the intermediate sheath 110 when the latter is in the plastic state after its extrusion, and consequently the intermediate sheath 110 can receive the information carrier unit 10' such that it is embedded at least partially within its outer surface 112 and forms a positive material bond.

Also in the case of this configuration of the information carrier unit 10'', it is ensured by the rounded edge regions 41' that no damage to the intermediate sheath 140 or the outer sheath 150 takes place during the bending of the cable 80''.

Figure 14:
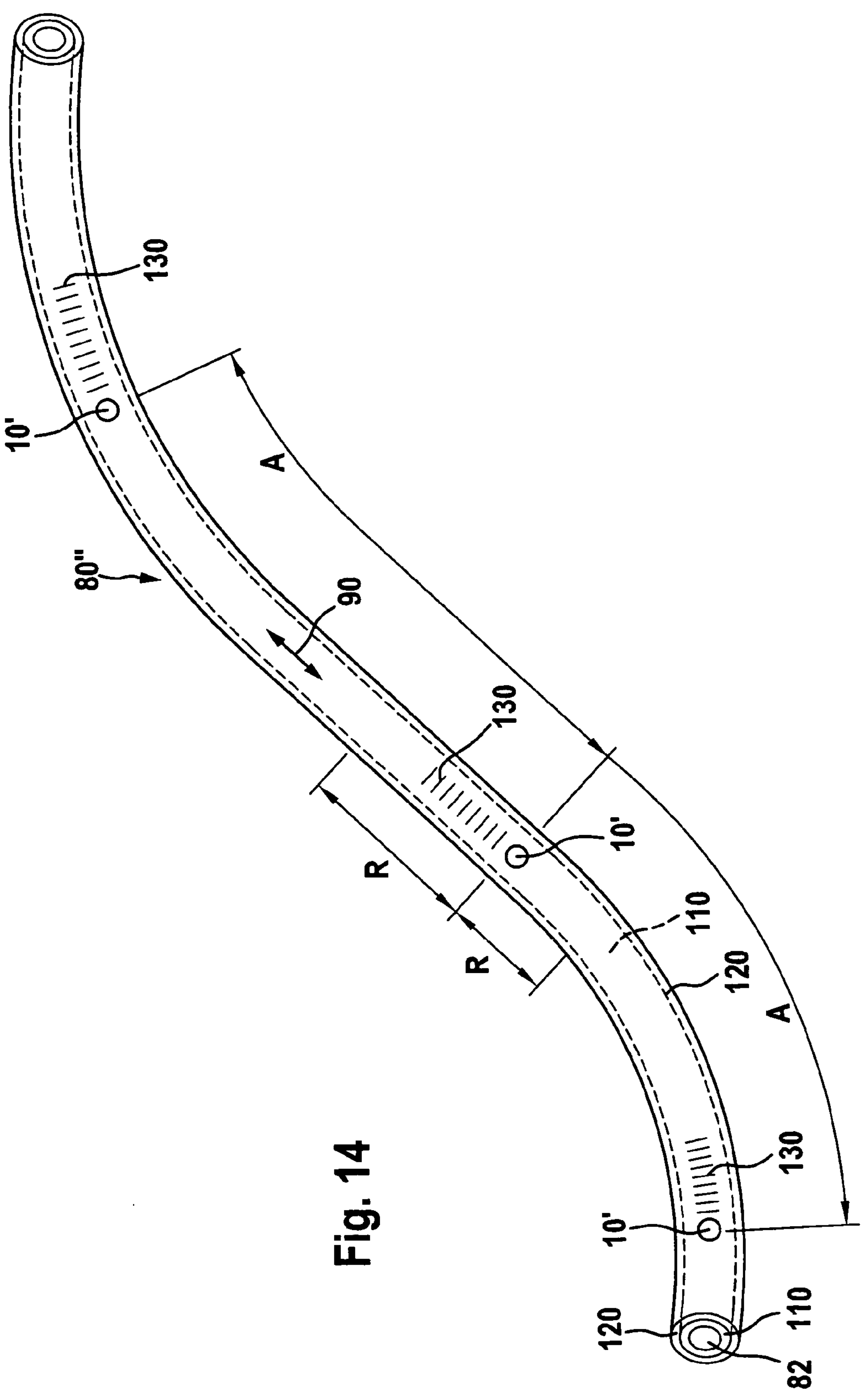
FIG. 14 shows a perspective view of a piece of cable of the third exemplary embodiment of the cable according to the invention and FIG. 15 shows a sectional representation similar to FIG. 9 of a fourth exemplary embodiment of a cable according to the invention.

As represented in FIG. 14 by way of example in conjunction with the third exemplary embodiment of the cable according to the invention, the cable 80'' comprises a number of information carrier units, which are disposed one after the other at distances A in the longitudinal direction 90 of the cable 80'', the distances A corresponding to defined regular geometrical intervals.

In the simplest case, the distances A are in this case approximately equal.

In the case of the information carrier units 10', furthermore, their reading/writing range R in the longitudinal direction 90 of the cable 80'' is chosen such that the reading/writing range R of the individual information carrier units 10' does not overlap in the longitudinal direction 90 of the cable 80'', but rather sufficient interspaces exist between the respective reading/writing ranges R.

It is in this way possible to move to, address and read each of the information carrier units 10' with the read device 20, without the risk of likewise reading out the information of neighboring information carrier units 10' at the same time, and it then consequently being unclear from which of the information carrier units 10' the information read-out originates.

In particular, the distances A are chosen such that they correspond to at least 2 times, preferably 2.5 times, the reading/writing range R.

Also in the case of this third exemplary embodiment of the cable 80'' according to the invention, the outer sheath 120 is preferably made of a material that is transparent in the visible spectral range, so that the user of the cable 80'' can already visually detect the position of the information carrier units 10' if their embedding body 50 is of a distinctly different color than the color of the intermediate sheath 110. In order alternatively or additionally to provide a further advantageous means for making it possible to establish the position of the information carrier units 10' in the longitudinal direction of the cable 80'', the outer sheath 120 is provided on the outer surface 102 of the cable with an inscription 130, which is disposed in a defined position in relation to the respective information carrier unit 10'.

For example, the inscription 130 may comprise a marking which indicates the position of the information carrier unit 10' or the inscription 130 may be laid out such that either the beginning of the inscription or the end of the inscription indicates the position of the information carrier unit 10'.

There is also the possibility, however, of providing the inscription 130 with a gap in the inscription which indicates the position of the information carrier unit 10'.

There is, however, also the possibility with the provision of the inscription 130 of making the outer sheath 120 not transparent, that is to say opaque, and indicating the position of the information carrier units 10' in the longitudinal direction 90 of the cable 80'' to the user of the cable 80'' merely by way of the inscription 130.

Figure 15:
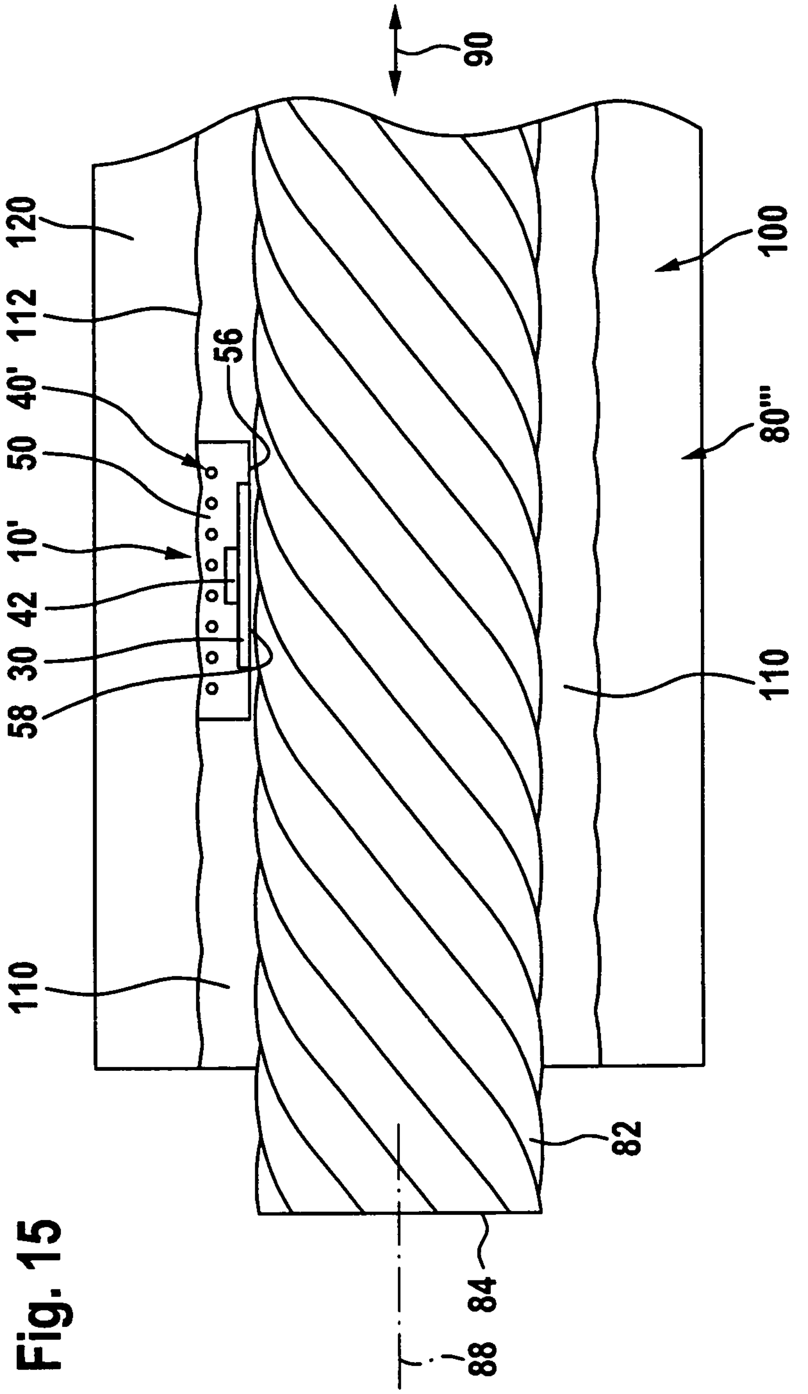

In the case of a fourth exemplary embodiment of a cable 80''' according to the invention, represented in FIG. 15, the thickness of the intermediate sheath 110 is formed such that it approximately corresponds to the thickness or height of the embedding body 50 of the information carrier unit 10' according to the second exemplary embodiment, so that, with substantially complete embedding of the embedding body 50 in the intermediate sheath 110 and with alignment of the sensor surface 58 such that it faces the inner cable body 82 and lies substantially on the surface 85 of the inner cable body 82, the sensor 30 can, for example, pick up radiation, temperature or pressure or moisture in the region of the surface 85 of the inner cable body in an approximate manner.

Otherwise, in the case of the second, third and fourth exemplary embodiments of the cable according to the invention, all the parts that are identical to those of the previous exemplary embodiments are provided with the same reference numerals, so that reference is respectively made to the description of the previous exemplary embodiments in their entirety.

In the case of all the exemplary embodiments in which parts are embedded into the softened material of the intermediate sheath 110, it would be conceivable to use the still softened state directly after the extrusion of the intermediate sheath for this purpose.

Another advantageous solution envisages heating the material of the intermediate sheath 110, in particular only locally, for the embedding of the parts, in order to obtain defined softening of the material of the intermediate sheath 110. For this purpose, the intermediate sheath 110 may be cooled, either completely or only partially, for example below a softening temperature.

The invention claimed is:

1. Cable, comprising:

an inner cable body, in which at least one conductor strand of an optical and/or electrical conductor runs in a longitudinal direction of the cable, a cable sheath, enclosing the inner cable body and lying between an outer surface of the cable and the inner cable body, and at least one information carrier unit, disposed within the outer surface of the cable, the at least one information carrier unit being adapted to be read by electromagnetic field coupling and the at least one information carrier unit being disposed on an intermediate sheath of the cable sheath lying between the inner cable body and an outer cable sheath of the cable sheath.

2. Cable according to claim 1, wherein the at least one information carrier unit is at least partly embedded in the intermediate sheath.

3. Cable according to claim 1, wherein an integrated circuit of the at least one information carrier unit is at least partly embedded in the intermediate sheath.

4. Cable according to claim 3, wherein the integrated circuit is predominantly embedded in the intermediate sheath.

5. Cable according to claim 3, wherein the integrated circuit is substantially embedded in the intermediate sheath.

6. Cable according to claim 1, wherein an antenna unit of the at least one information carrier unit is disposed at a surface of the intermediate sheath.

7. Cable according to claim 6, wherein the antenna unit is disposed on a surface of the intermediate sheath.

8. Cable according to claim 1, wherein an antenna unit of the at least one information carrier unit is at least partly embedded in the intermediate sheath.

9. Cable according to claim 1, wherein an antenna unit of the at least one information carrier unit is formed as a conductor track on a base and the base lies at a surface of the intermediate sheath.

10. Cable according to claim 1, wherein an antenna unit of the at least one information carrier unit is formed as a conductor track disposed directly on the intermediate sheath.

11. Cable according to claim 10, wherein the conductor track is formed by a conductive material applied to the intermediate sheath.

12. Cable according to claim 1, wherein an integrated circuit of the at least one information carrier unit is at least partly embedded in the outer cable sheath.

13. Cable according to claim 12, wherein the integrated circuit is substantially embedded in the outer cable sheath.

14. Cable according to claim 1, wherein the intermediate sheath has, between the at least one information carrier unit and the inner cable body, a material layer compensating for surface undulations of the inner cable body.

15. Cable according to claim 1, wherein the intermediate sheath forms a surface which is substantially free from surface undulations of the inner cable body.

16. Cable according to claim 1, wherein the outer cable sheath is made of a material that is transparent in a visible spectral range.

17. Cable according to claim 1, wherein the outer cable sheath carries an inscription and the inscription is disposed in a defined relationship with respect to the at least one information carrier unit.

18. Cable according to claim 1, wherein the at least one information carrier unit has at least one memory.

19. Cable according to claim 18, wherein the at least one memory has a memory area in which items of information once written are stored such that they are write-protected.

20. Cable according to claim 18, wherein the at least one memory has a memory area in which items of information are stored such that they are write-protected by an access code.

* * * * *